(12) United States Patent
Cho et al.

(10) Patent No.: US 8,984,338 B2
(45) Date of Patent: Mar. 17, 2015

(54) HOME APPLIANCE DIAGNOSIS SYSTEM, AND METHOD FOR OPERATING SAME

(75) Inventors: In Haeng Cho, Changwon-si (KR); Phal Jin Lee, Changwon-si (KR); Hoi Jin Jeong, Changwon-si (KR); Jong Hye Han, Changwon-si (KR)

(73) Assignee: LG Electronics Inc., Seoul (KR)

( * ) Notice: Subject to any disclaimer, the term of this patent is extended or adjusted under 35 U.S.C. 154(b) by 431 days.

(21) Appl. No.: 13/382,334

(22) PCT Filed: Jul. 6, 2010

(86) PCT No.: PCT/KR2010/004407
§ 371 (c)(1),
(2), (4) Date: Apr. 19, 2012

(87) PCT Pub. No.: WO2011/005018
PCT Pub. Date: Jan. 13, 2011

(65) Prior Publication Data
US 2012/0198274 A1   Aug. 2, 2012

Related U.S. Application Data

(60) Provisional application No. 61/223,140, filed on Jul. 6, 2009.

(51) Int. Cl.
*G06F 11/00* (2006.01)
*H04L 12/28* (2006.01)
(Continued)

(52) U.S. Cl.
CPC ........ *H04L 12/2825* (2013.01); *G06F 11/0793* (2013.01); *G06F 11/0748* (2013.01);
(Continued)

(58) Field of Classification Search
CPC ............ G06F 11/0748; G06F 11/2294; G06F 1/1698; G06F 11/0793
See application file for complete search history.

(56) References Cited

U.S. PATENT DOCUMENTS 3,910,322 A   10/1975   Hardesty et al.
4,146,754 A   3/1979    Rose
(Continued)

FOREIGN PATENT DOCUMENTS

| CN | 1212304 | 3/1999 |
| CN | 1343862 | 4/2002 |

(Continued)

OTHER PUBLICATIONS

International Search Report issued in Application No. PCT/KR2011/000311 dated Jul. 28, 2011.
(Continued)

*Primary Examiner* — Charles Ehne
(74) *Attorney, Agent, or Firm* — Ked & Associates, LLP

(57) ABSTRACT

The present invention relates to a home appliance diagnosis system and to a method for operating same, wherein product information is output in a predetermined signal sound by a home appliance product, and the signal sound is transmitted via a communication network connected to a remote service center to enable the service center to easily check the state of the home appliance product. In addition, the product information is encoded into a predetermined format and modulated to enable sound to be outputted by the home appliance product, thereby preventing noise or signal errors. The present invention enables stable signal modulation and accurate sound output, and enables the easy recovery of the sound transmitted to the service center via the communication network.

17 Claims, 19 Drawing Sheets

(51) Int. Cl.
*H04L 12/12* (2006.01)
*G06F 11/07* (2006.01)
*G06F 11/22* (2006.01)

(52) U.S. Cl.
CPC ............ *G06F11/2294* (2013.01); *H04L 12/12* (2013.01); *H04L 2012/285* (2013.01); *Y02B 60/34* (2013.01)
USPC .......................................................... 714/30

(56) References Cited

U.S. PATENT DOCUMENTS

| | | |
|---|---|---|
| 4,766,505 A | 8/1988 | Nakano et al. |
| 4,797,656 A | 1/1989 | Keppler |
| 4,897,659 A | 1/1990 | Mellon |
| 4,897,857 A | 1/1990 | Wakatsuki et al. |
| 4,916,439 A | 4/1990 | Estes et al. |
| 4,977,394 A | 12/1990 | Manson et al. |
| 5,103,214 A | 4/1992 | Curran et al. |
| 5,210,784 A | 5/1993 | Wang et al. |
| 5,268,666 A | 12/1993 | Michel et al. |
| 5,452,344 A | 9/1995 | Larson |
| 5,506,892 A | 4/1996 | Kojima et al. |
| 5,586,174 A | 12/1996 | Bogner et al. |
| 5,664,218 A | 9/1997 | Kim et al. |
| 5,757,643 A | 5/1998 | Kuroda et al. |
| 5,774,529 A | 6/1998 | Johannsen et al. |
| 5,864,828 A | 1/1999 | Atkins |
| 5,939,992 A | 8/1999 | Devries et al. |
| 5,940,915 A | 8/1999 | Nam ................................. 8/159 |
| 5,987,105 A * | 11/1999 | Jenkins et al. ........... 379/106.01 |
| 6,121,593 A | 9/2000 | Mansbery et al. |
| 6,157,313 A | 12/2000 | Emmermann |
| 6,424,252 B1 | 7/2002 | Adler |
| 6,727,814 B2 | 4/2004 | Saltzstein et al. |
| 6,759,954 B1 | 7/2004 | Myron et al. |
| 6,763,458 B1 | 7/2004 | Watanabe et al. ............. 713/100 |
| 6,778,868 B2 | 8/2004 | Imamura et al. |
| 6,784,801 B2 | 8/2004 | Watanabe et al. |
| 6,870,480 B2 | 3/2005 | Suzuki et al. |
| 6,873,255 B2 | 3/2005 | Gallagher |
| 6,906,617 B1 | 6/2005 | Van der Meulen |
| 7,010,612 B1 | 3/2006 | Si et al. |
| 7,135,982 B2 | 11/2006 | Lee ................. 340/635 |
| 7,243,174 B2 | 7/2007 | Sheahan et al. |
| 7,266,164 B2 | 9/2007 | Jeon et al. |
| 7,280,643 B2 | 10/2007 | Howard et al. ............ 379/93.37 |
| 7,337,457 B2 | 2/2008 | Pack et al. ........................ 725/40 |
| 7,363,031 B1 | 4/2008 | Aisa |
| 7,383,644 B2 | 6/2008 | Lyu et al. |
| 7,439,439 B2 | 10/2008 | Hayes et al. ..................... 84/600 |
| 7,509,824 B2 | 3/2009 | Pack et al. ..................... 68/12.23 |
| 7,558,700 B2 | 7/2009 | Yamashita et al. |
| 7,574,269 B2 | 8/2009 | Cenedese et al. |
| 7,631,063 B1 | 12/2009 | Ho et al. |
| 7,648,476 B2 | 1/2010 | Bock et al. |
| 7,653,512 B2 | 1/2010 | Cheung et al. ................ 702/184 |
| 7,750,227 B2 | 7/2010 | Hayes et al. |
| 7,843,819 B1 | 11/2010 | Benveniste |
| 7,965,632 B2 | 6/2011 | Sugaya |
| 8,027,752 B2 | 9/2011 | Castaldo et al. |
| 8,040,234 B2 | 10/2011 | Ebrom et al. ................. 340/531 |
| 8,045,636 B1 | 10/2011 | Lee et al. |
| 8,132,049 B2 | 3/2012 | Yasukawa et al. |
| 8,204,189 B2 | 6/2012 | Rhodes et al. |
| 8,325,054 B2 | 12/2012 | Kim et al. |
| 8,391,255 B2 | 3/2013 | Ribiere et al. |
| 8,428,910 B2 | 4/2013 | Papadimitriou et al. |
| 2002/0029575 A1 | 3/2002 | Okamoto |
| 2002/0032491 A1 | 3/2002 | Imamura et al. |
| 2002/0078742 A1 | 6/2002 | Kim ................................. 73/162 |
| 2002/0097161 A1 | 7/2002 | Deeds |
| 2002/0116959 A1 | 8/2002 | Ohta et al. |
| 2002/0120728 A1 | 8/2002 | Braatz et al. |
| 2003/0028345 A1 | 2/2003 | Watkins et al. |
| 2003/0058101 A1 | 3/2003 | Watanabe et al. |
| 2003/0110363 A1 | 6/2003 | Bachot et al. |
| 2003/0128850 A1 | 7/2003 | Kimura et al. |
| 2003/0144010 A1 | 7/2003 | Dollinger |
| 2003/0167782 A1 | 9/2003 | Roh et al. |
| 2003/0196492 A1 | 10/2003 | Remboski et al. .............. 73/593 |
| 2004/0032853 A1 | 2/2004 | D'Amico et al. |
| 2004/0132444 A1 | 7/2004 | Herrmann |
| 2004/0158333 A1 | 8/2004 | Ha et al. |
| 2004/0211228 A1 | 10/2004 | Nishio et al. |
| 2004/0249903 A1 | 12/2004 | Ha et al. |
| 2004/0261468 A1 | 12/2004 | Lueckenbach |
| 2005/0015890 A1 | 1/2005 | Kim et al. |
| 2005/0028034 A1* | 2/2005 | Gantman et al. ................ 714/27 |
| 2005/0029976 A1 | 2/2005 | Terry et al. |
| 2005/0086979 A1 | 4/2005 | Son et al. |
| 2005/0129200 A1 | 6/2005 | Forrest et al. .............. 379/93.37 |
| 2005/0134472 A1 | 6/2005 | Jang et al. |
| 2005/0162909 A1 | 7/2005 | Wooldridge |
| 2005/0222859 A1 | 10/2005 | Ha |
| 2006/0048405 A1 | 3/2006 | Baek et al. |
| 2006/0066758 A1 | 3/2006 | Higashihara |
| 2006/0089818 A1 | 4/2006 | Norell et al. |
| 2006/0136544 A1 | 6/2006 | Atsmon et al. |
| 2006/0168740 A1 | 8/2006 | Ha et al. |
| 2006/0259199 A1 | 11/2006 | Gjerde et al. |
| 2007/0113595 A1 | 5/2007 | Harwood et al. |
| 2007/0137265 A1 | 6/2007 | Shikamori et al. |
| 2007/0175883 A1 | 8/2007 | Miu et al. |
| 2007/0189323 A1 | 8/2007 | Swoboda et al. |
| 2007/0219756 A1 | 9/2007 | Frankel et al. |
| 2007/0272286 A1 | 11/2007 | Curtius et al. |
| 2008/0036619 A1 | 2/2008 | Rhodes et al. |
| 2008/0072383 A1 | 3/2008 | Bextermoller et al. |
| 2008/0122648 A1 | 5/2008 | Ebrom et al. |
| 2008/0181058 A1 | 7/2008 | Hayakawa |
| 2009/0036778 A1 | 2/2009 | Cohen et al. |
| 2009/0067102 A1 | 3/2009 | Cline et al. |
| 2009/0160637 A1 | 6/2009 | Maeng |
| 2009/0169434 A1 | 7/2009 | Ogusu |
| 2009/0282308 A1 | 11/2009 | Gutsche et al. |
| 2009/0323914 A1 | 12/2009 | Lee et al. |
| 2010/0023938 A1 | 1/2010 | Lee et al. |
| 2010/0027770 A1 | 2/2010 | Park et al. |
| 2010/0037401 A1 | 2/2010 | Bae et al. |
| 2010/0116060 A1 | 5/2010 | Murayama ....................... 73/593 |
| 2010/0318324 A1 | 12/2010 | Kim et al. |
| 2011/0022358 A1 | 1/2011 | Han et al. |
| 2011/0060553 A1 | 3/2011 | Han et al. |
| 2011/0074589 A1 | 3/2011 | Han et al. |
| 2011/0200189 A1 | 8/2011 | True et al. |

FOREIGN PATENT DOCUMENTS

| | | |
|---|---|---|
| CN | 1393672 | 1/2003 |
| CN | 1409886 | 4/2003 |
| CN | 1424843 | 6/2003 |
| CN | 1497915 | 5/2004 |
| CN | 1606282 | 4/2005 |
| CN | 1690685 | 11/2005 |
| CN | 2797999 | 7/2006 |
| CN | 101202639 | 6/2008 |
| CN | 101447119 | 6/2009 |
| CN | 101680693 | 3/2010 |
| CN | 102017520 | 4/2011 |
| EP | 0 038 687 | 10/1981 |
| EP | 0 510 519 A1 | 10/1992 |
| EP | 0 617 557 A2 | 9/1994 |
| EP | 0 691 060 B1 | 1/1996 |
| EP | 0 742 308 | 11/1996 |
| EP | 0 846 991 | 6/1998 |
| EP | 0 851 054 | 7/1998 |
| EP | 0 887 989 | 12/1998 |
| EP | 1 186 694 | 3/2002 |
| EP | 1 186 695 | 3/2002 |
| EP | 2 180 648 | 4/2010 |
| JP | 04-241563 | 8/1992 |
| JP | 04-358497 | 12/1992 |
| JP | 4-358497 A | 12/1992 |

(56) References Cited

FOREIGN PATENT DOCUMENTS

| | | |
|---|---|---|
| JP | 07-239176 | 9/1995 |
| JP | 10-133767 | 5/1998 |
| JP | 11-127254 | 5/1999 |
| JP | 11-127254 | 11/1999 |
| JP | 2001-345949 | 12/2001 |
| JP | 2001-353395 A | 12/2001 |
| JP | 2002-000988 A | 1/2002 |
| JP | 2002-011274 A | 1/2002 |
| JP | 2002-031471 | 1/2002 |
| JP | 2002-045590 A | 2/2002 |
| JP | 2002-85887 | 3/2002 |
| JP | 2002-162149 | 6/2002 |
| JP | 2002-279091 | 9/2002 |
| JP | 2003-172578 | 6/2003 |
| JP | 2004-085071 | 3/2004 |
| JP | 2004-215125 | 7/2004 |
| JP | 2005-061757 | 3/2005 |
| JP | 2005-273943 | 10/2005 |
| JP | 2007-267956 A | 10/2007 |
| JP | 2008-003562 A | 1/2008 |
| KR | 10-1991-0020404 | 12/1991 |
| KR | 10-1991-0020404 A | 12/1991 |
| KR | 10-1996-0003308 A | 1/1996 |
| KR | 10-1997-0019443 | 4/1997 |
| KR | 10-1997-0019443 A | 4/1997 |
| KR | 10-0127232 | 10/1997 |
| KR | 10-0143209 | 8/1998 |
| KR | 10-1999-020285 | 3/1999 |
| KR | 20-1999-0040564 U | 12/1999 |
| KR | 20-0162050 | 12/1999 |
| KR | 10-2000-0018678 A | 4/2000 |
| KR | 10-2001-0063913 A | 5/2001 |
| KR | 10-2001-0055394 A | 7/2001 |
| KR | 10-2002-0020831 A | 3/2002 |
| KR | 10-2002-0030426 A | 4/2002 |
| KR | 10-2002-0039959 | 5/2002 |
| KR | 10-2003-0000189 | 1/2003 |
| KR | 10-2004-0050767 | 6/2004 |
| KR | 10-2004-0095017 | 11/2004 |
| KR | 10-2004-0103352 | 12/2004 |
| KR | 10-2005-0062747 A | 6/2005 |
| KR | 10-2005-0097282 | 10/2005 |
| KR | 20-1999-0040564 | 10/2005 |
| KR | 10-2006-0056973 | 5/2006 |
| KR | 10-2006-0103014 | 9/2006 |
| KR | 10-0641974 | 11/2006 |
| KR | 10-2007-0013090 A | 1/2007 |
| KR | 10-2008-0068447 | 7/2008 |
| KR | 10-0887575 | 3/2009 |
| KR | 10-2009-0115066 | 11/2009 |
| KR | 10-2010-0112950 | 10/2010 |
| KR | 10-2011-0010375 | 2/2011 |
| KR | 10-2011-0010378 | 2/2011 |
| WO | WO 01/11575 | 2/2001 |
| WO | WO 2005/106096 | 11/2005 |
| WO | WO 2008/010670 | 1/2008 |
| WO | WO 2008/117981 | 10/2008 |
| WO | WO 2009/134090 | 11/2009 |

OTHER PUBLICATIONS

U.S. Office Action issued in U.S. Appl. No. 12/431,893 dated Jul. 31, 2012.
Notice of Allowance issued in U.S. Appl. No. 12/842,679 dated Aug. 1, 2012.
U.S. Office Action issued in U.S. Appl. No. 12/431,903 dated Aug. 2, 2012.
U.S. Office Action issued in U.S. Appl. No. 12/432,184 dated Aug. 7, 2012.
Korean Notice of Allowance dated Aug. 30, 2013.
U.S. Office Action issued in U.S. Appl. No. 12/842,649 dated Oct. 8, 2013.
Chinese Office Action dated Oct. 10, 2013.
U.S. Notice of Allowance issued in U.S. Appl. No. 12/846,013 dated Nov. 5, 2013.
Korean Office Action dated Aug. 13, 2012.
Japanese Office Action dated Sep. 11, 2012.
Notice of Allowance issued in U.S. Appl. No. 12/757,205 dated Sep. 14, 2012.
U.S. Office Action issued in U.S. Appl. No. 12/847,303 dated Sep. 14, 2012.
U.S. Office Action issued in U.S. Appl. No. 12/757,232 dated Sep. 18, 2012.
U.S. Office Action issued in U.S. Appl. No. 12/757,232 dated Apr. 18, 2013.
U.S. Office Action issued in U.S. Appl. No. 12/846,013 dated May 7, 2013.
U.S. Notice of Allowance issued in U.S. Appl. No. 12/603,810 dated Jun. 12, 2013.
U.S. Office Action issued in U.S. Appl. No. 12/432,111 dated Jun. 13, 2013.
U.S. Office Action issued in U.S. Appl. No. 12/847,272 dated Jun. 27, 2013.
U.S. Office Action issued in U.S. Appl. No. 12/757,213 dated Jun. 28, 2013.
U.S. Office Action issued in U.S. Appl. No. 12/847,284 dated Jun. 28, 2013.
U.S. Office Action issued in U.S. Appl. No. 12/847,406 dated Jul. 9, 2013.
U.S. Office Action issued in U.S. Appl. No. 12/847,306 dated Jul. 9, 2013.
European Search Report dated Dec. 17, 2012.
European Search Report dated Jan. 2, 2013.
Ethem M Sözer; "Simulation and Rapid Prototyping Environment for Underwater Acoustic Communications: Reconfigurable Modem"; Oceans—Europe 2005; MIT Sea Grant College Program; Cambridge, MA, 02139; IEEE; pp. 80-85 (XP10838461A).
U.S. Office Action issued in U.S. Appl. No. 12/757,339 dated Jan. 31, 2013.
European Search Report dated Jan. 31, 2013. (10761908.2).
European Search Report dated Jan. 31, 2013. (10797292.9).
Japanese Office Action dated Feb. 12, 2013. (with translation).
U.S. Office Action issued in U.S. Appl. No. 12/603,810 dated Feb. 13, 2013.
U.S. Office Action issued in U.S. Appl. No. 12/551,827 dated Mar. 11, 2013.
U.S. Office Action issued in U.S. Appl. No. 12/842,649 dated Mar. 22, 2013.
International Search Report issued in PCT Application No. PCT/KR2010/004407 dated Apr. 25, 2011.
Creber, R. K. et al.; "Performance of Undersea Acoustic Networking Using RTS/CTS Handshaking and ARQ Retransmission"; Oceans, 2001 MTS/IEEE Conference and Exhibition; Nov. 5-8, 2001; Piscataway, NJ; IEEE, vol. 4; Nov. 5, 2001; pp. 2083-2086 (XP010566758).
International Search Report dated Dec. 18, 2009 issued in Application No. PCT/KR2009/002288.
International Search Report dated Dec. 21, 2009 issued in Application No. PCT/KR2009/002199.
International Search Report dated Jan. 4, 2010 issued in Application No. PCT/KR2009/002211.
PCT International Search Report dated Aug. 23, 2010 issued in Application No. PCT/KR2010/000319.
PCT International Search Report dated Dec. 1, 2010 issued in Application No. PCT/KR2010/002222.
PCT International Search Report dated Dec. 1, 2010 issued in Application No. PCT/KR2010/002211.
PCT International Search Report dated May 26, 2011 issued in Application No. PCT/KR2010/005108.
European Search Report dated Oct. 14, 2011 issued in Application No. 09 73 8950.
United States Office Action dated Dec. 27, 2011 issued in U.S. Appl. No. 12/432,184.
United States Office Action dated Feb. 10, 2012 issued in U.S. Appl. No. 12/568,022.
United States Office Action dated Feb. 14, 2012 issued in U.S. Appl. No. 12/431,910.

(56) References Cited

OTHER PUBLICATIONS

United States Office Action dated Mar. 1, 2012 issued in U.S. Appl. No. 12/846,040.
Chinese Office Action dated Dec. 16, 2013.(translation).
European Office Action dated Jan. 7, 2014. (11803799.3).
European Office Action dated Jan. 7, 2014. (11803798.5).
Australian Office Action dated Jan. 13, 2014.
Korean Office Action dated Jan. 28, 2014.
Japanese Office Action dated Feb. 4, 2014.
Russian Office Action issued in Application No. 2010144513/08 dated Jun. 27, 2012.
U.S. Office Action issued in U.S. Appl. No. 12/432,132 dated Aug. 15, 2012.
U.S. Office Action issued in U.S. Appl. No. 12/551,827 dated Aug. 16, 2012.
Notice of Allowance issued in U.S. Appl. No. 12/846,040 dated Aug. 17, 2012.
Japanese Office Action dated Oct. 29, 2013.
U.S. Office Action issued in U.S. Appl. No. 12/847,272 dated Dec. 2, 2013.
U.S. Office Action issued in U.S. Appl. No. 12/847,284 dated Dec. 4, 2013.
U.S. Office Action issued in U.S. Appl. No. 12/847,406 dated Dec. 17, 2013.
U.S. Office Action issued in U.S. Appl. No. 12/847,306 dated Dec. 17, 2013.
Korean Office Action dated Feb. 26, 2014.
Korean Office Action dated Feb. 28, 2014.
Chinese Office Action dated Mar. 4, 2014.
Chinese Office Action dated Mar. 5, 2014.
U.S. Office Action issued in U.S. Appl. No. 12/432,111 dated May 2, 2012.
European Search Report dated May 8, 2012.
Milica Stojanovic; "Recent Advances in High-Speed underwater Acoustic Communications"; IEEE Journal of Oceanice Engineering, IEEE Service Center; Piscataway, NJ; vol. 21, No. 2; Apr. 1, 1996; pp. 125-136 (XP011042321).
U.S. Office Action issued in U.S. Appl. No. 12/757,246 dated May 18, 2012.
U.S. Office Action issued in U.S. Appl. No. 12/757,339 dated May 22, 2012.
U.S. Notice of Allowance issued in U.S. Appl. No. 12/568,022 dated Jun. 11, 2012.
U.S. Office Action issued in U.S. Appl. No. 12/757,213 dated Jun. 25, 2012.
U.S. Office Action issued in U.S. Appl. No. 12/603,810 dated Jul. 5, 2012.
U.S. Office Action issued in U.S. Appl. No. 12/431,910 dated Jul. 23, 2012.
Russian Office Action dated Feb. 7, 2012. (with translation).
U.S. Office Action issued in U.S. Appl. No. 12/431,903 dated Mar. 8, 2012.
U.S. Office Action issued in U.S. Appl. No. 12/431,893 dated Mar. 19, 2012.
U.S. Office Action issued in U.S. Appl. No. 12/432,132 dated Mar. 20, 2012.
U.S. Office Action issued in U.S. Appl. No. 12/757,205 dated Apr. 2, 2012.
Chinese Office Action dated Jun. 27, 2013.
U.S. Office Action issued in U.S. Appl. No. 12/431,893 dated Jul. 30, 2013.
U.S. Office Action issued in U.S. Appl. No. 12/757,339 dated Sep. 6, 2013.
U.S. Office Action issued in U.S. Appl. No. 12/432,111 dated Nov. 15, 2012.
Chinese Office Action dated Nov. 16, 2012.
U.S. Office Action issued in U.S. Appl. No. 12/431,910 dated Dec. 5, 2012.
U.S. Office Action issued in U.S. Appl. No. 12/757,213 dated Dec. 13, 2012.
U.S. Office Action issued in U.S. Appl. No. 12/432,132 dated Dec. 19, 2012.
U.S. Office Action issued in U.S. Appl. No. 12/850,240 dated Dec. 27, 2012.
U.S. Office Action issued in U.S. Appl. No. 12/846,013 dated Dec. 28, 2012.
U.S. Notice of Allowance issued in U.S. Appl. No. 12/847,303 dated Jan. 11, 2013.
U.S. Office Action issued in U.S. Appl. No. 12/431,903 dated Jan. 2, 2013.
U.S. Office Action issued in U.S. Appl. No. 12/757,246 dated Jan. 17, 2013.
U.S. Office Action issued in U.S. Appl. No. 12/431,893 dated Jan. 29, 2013.
U.S. Office Action issued in U.S. Appl. No. 12/432,184 dated May 22, 2014.
Korean Office Action dated May 26, 2014.
U.S. Notice of Allowance issued in U.S. Appl. No. 12/757,339 dated May 28, 2014.
Chinese Office Action dated Dec. 3, 2014.
Chinese Office Action dated Oct. 30, 2014.
Japanese Office Action dated Nov. 18, 2014.
U.S. Notice of Allowance issued in U.S. Appl. No. 13/922,669 dated Dec. 31, 2014.
U.S. Office Action issued in U.S. Appl. No. 12/842,649 dated Aug. 15, 2014.
Australian Office Action dated Sep. 22, 2014.
Chinese Office Action dated Oct. 8, 2014.
U.S. Office Action issued in U.S. Appl. No. 13/562,704 dated Nov. 19, 2014.
U.S. Notice of Allowance issued in U.S. Appl. No. 12/842,649 dated Dec. 10, 2014.

\* cited by examiner

| Version | Product ID | Diagnosis Data |
|---------|------------|----------------|
| 1 Byte  | 7 Bytes    | 52 Bytes       |

(b)

| Version | Protocol Name |
|---------|---------------|
| 0x01    | Smart Diagnosis for Washing Machine v1.0 |

(a)

(b)

(a)

(b)

(a)

(b)

(a)

(b)

(a)

(b)

(a)

(b)

HOME APPLIANCE DIAGNOSIS SYSTEM, AND METHOD FOR OPERATING SAME

TECHNICAL FIELD

The present invention relates to a home appliance diagnosis system and a method of operating the same, and more particularly, to a home appliance diagnosis system and a method of operating the same that enable to easily perform a state check and an after-sales service of the home appliance by outputting product information of the home appliance with a predetermined sound.

BACKGROUND ART

A home appliance stores a setting value for performing operation, information generated while operating, and failure information while performing a predetermined operation, particularly, when a failure occurs, by outputting predetermined alarm, a user using the home appliance enables to recognize a state of the home appliance. Such a home appliance outputs specific failure information through a provided output means, for example, a display means and a lamp as well as simply notifying operation completion or occurrence of a failure.

When an error occurs in the home appliance, the user communicates with a service center and uses an after-sales service such as asking an advice about a state of the home appliance, or requesting a service engineer for the home appliance having an error.

In this case, in general, failure information is simply output from the home appliance, or output as a code value in which the user cannot know, and thus it is difficult for the user to cope with a failure of the home appliance, and even if the user communicates with a service center, it may be difficult to accurately transfer a state of the home appliance. Thereby, when the service engineer visits a home, the service engineer does not previously accurately grasp a state of the home appliance, and thus much time and cost for repair of the home appliance are consumed. For example, when parts for repair of the home appliance are not previously prepared, it is necessary for the service engineer to revisit the home and much time is thus consumed.

In order to solve such a problem, the home appliance and a server of the service center may be connected through a predetermined communication means, but there is a problem that should construct a communication network.

Further, with development of technology, failure information has been diagnosed with remote control using a phone network.

In European Patent Application No. EP0510519, technology that transmits failure information of a home appliance to a service center using a phone network through a modem connected to the home appliance is disclosed, but in this case, there is a problem that the modem should be always connected to the home appliance. Particularly, a home appliance such as a laundry processing device is generally installed outdoors, and a location limitation exists in connecting the laundry processing device and the phone network.

In U.S. Pat. No. 5,987,105, technology that modulates failure information of a home appliance to a sound of an audible frequency range using a phone network and transmits the sound to a service center through a phone is disclosed. In a process of modulating failure information of the home appliance to a sound of an audible frequency range and transferring the sound to a receiver of a phone, signal interference due to peripheral environment may occur, and in a process in which a sound is transmitted through the phone network, there is a problem that data may be damaged according to a characteristic of the phone network.

In previously described U.S. Pat. No. 5,987,105, in order to prevent data damage and transmit accurate product information, a size of 1 symbol expressing 1 bit, which is one information unit is set to 30 ms, and an independent frequency per each bit is used.

In order to minimize an interval in which the same frequency is repeated, a frequency should be used to correspond to the number of data. In order to express 7 data, 7 different frequencies should be used. Accordingly, there was a problem that many frequencies are unnecessarily used.

Further, in order to solve a problem due to use of such many frequencies, the number of use frequencies should be reduced, and in order to reduce the number of use frequencies, a size of a symbol should be increased, and there is a problem in increasing a symbol time of existing 30 ms to 100 ms or more. In this case, because a size of a symbol is large, a size of data to transmit also increases and thus there was a problem that a transmission time increases.

Further, in a convention case, due to a characteristic of a terminal or a communication network that transmits a sound, a sound may be distorted or lost, but measures thereof are unprepared.

Accordingly, it is necessary to effectively express and transmit product information using a frequency of the small number and to improve accuracy of transmission.

DISCLOSURE

Technical Problem

An aspect of the present invention is to provide a home appliance diagnosis system that can output a sound including product information from a home appliance and that can easily perform a failure diagnosis of the home appliance using a sound including product information.

Further, another aspect of the present invention is to provide a home appliance diagnosis system and a method of operating the same that improve a recognition rate and enable easy transmission of an output sound by adjusting modulation of a signal and a frequency characteristic of a signal according to an output of the sound and that improve accuracy and efficiency of a failure diagnosis of the home appliance.

Technical Solution

In an aspect, a home appliance includes: a selection unit for inputting an instruction for performing a failure diagnosis; a memory for storing product information of the home appliance for the failure diagnosis; a controller for changing a mode of the home appliance to a smart diagnosis mode and for encoding the product information stored at the memory and for generating the product information into a control signal formed with a plurality of frames, when a failure diagnosis execution instruction is input by the selection unit; a modulator for generating a predetermined frequency signal to correspond to the control signal; and an audio output unit driven by the modulator to output a sound to correspond to the frequency signal, wherein the controller includes: a main controller for controlling to display a progress state of a smart diagnosis mode through the audio output unit when entered a smart diagnosis mode by an input to the selection unit; and an encoding unit for generating the control signal by encoding the product information to a control signal of a predetermined format.

In another aspect, a method of operating a home appliance, the method includes: storing product information when an error occurs; entering a smart diagnosis mode, when an instruction for performing a failure diagnosis is input; dividing the stored product information into a plurality of frames and generating a control signal by encoding in a frame unit; and modulating the control signal using a plurality of frequencies and outputting the control signal with a predetermined sound through an audio output unit.

In another aspect, a home appliance diagnosis system includes: a home appliance for outputting necessary product information with a predetermined sound upon diagnosing a failure; a diagnosis server for analyzing the product information by receiving the sound, diagnosing a state, a failure, and a failure cause of the home appliance by extracting predetermined data of diagnosis data included in the product information, and for deriving measures of a failure; and a terminal for receiving the sound output from the home appliance as a sound signal and transmitting to the diagnosis server through a communication network.

Advantageous Effects

In a home appliance diagnosis system and a method of operating the same according to the present invention having the above configuration, when outputting a sound including product information from the home appliance, by forming the product information with a plurality of frames and by outputting a sound by coding according to a predetermined method in a frame unit, the sound can be effectively and accurately output, noise or a signal error generated in a modulation process of a signal can be prevented, and stable signal modulation and an accurate sound output can be performed.

Further, because the present invention can perform accurate data transmission necessary for diagnosing a failure, a recognition rate and a transmission rate of a sound can be improved, a failure diagnosis of a home appliance using a sound can be easily performed, and accuracy of a failure diagnosis can be improved.

DESCRIPTION OF DRAWINGS

FIG. 5 is a diagram illustrating encoding of product information of a home appliance and a configuration of a control signal according to the encoding;

BEST MODE

Hereinafter, an exemplary embodiment of the present invention will be described with reference to the attached drawings.

Figure 1:
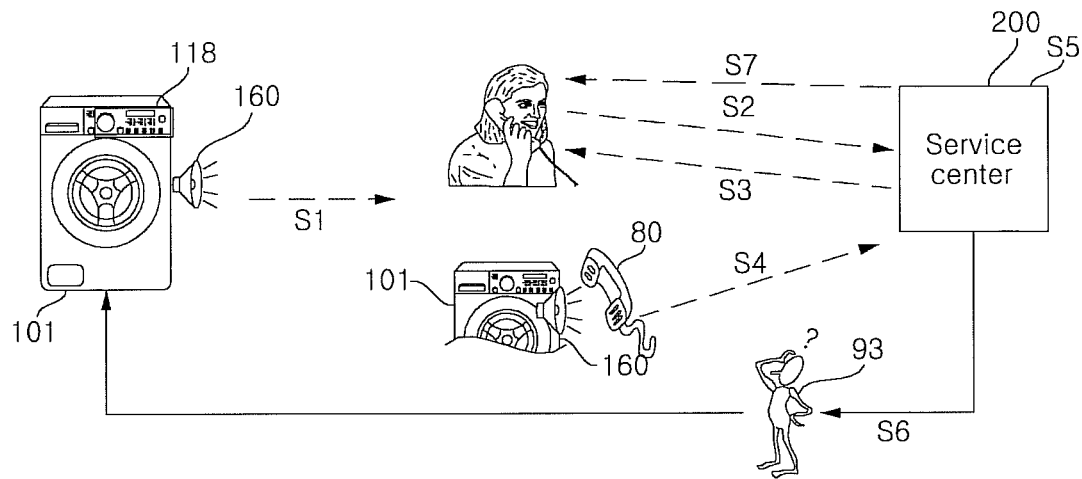
FIG. 1 is a diagram illustrating a configuration of a home appliance diagnosis system according to an exemplary embodiment of the present invention.

FIG. 1 is a diagram illustrating a configuration of a home appliance diagnosis system according to an exemplary embodiment of the present invention.

Referring to FIG. 1, in the home appliance diagnosis system according to an exemplary embodiment of the present invention, when information about operation of a home appliance 101 of each home is output as a sound from the home appliance, a sound included in product information is input to a terminal such as a phone or a mobile terminal, and the input sound is transmitted as a sound signal to a service center 200 through a communication network, and a diagnosis server of the service center determines whether a failure occurs by diagnosing a state of the home appliance.

The home appliance diagnosis system includes a home appliance 101 and a service center 200 for diagnosing a state and a failure of the home appliance. In this case, the service center includes a diagnosis server having information of the home appliance and a diagnosis program.

The home appliance 101 includes a display unit 118 for displaying predetermined data, and the display unit is a light emitting body such as an LED, an LCD, and an organic EL and visualizes and displays state information, or failure information of the home appliance 101. Further, the home appliance 101 includes an audio output unit 160 as a means for outputting a sound, and the audio output unit 160 reproduces information about an operation, a state, and a failure of the home appliance 101 and outputs as a predetermined sound.

When a failure occurs in the home appliance 101 while operating or when an error occurs in operation of the home appliance 101, the home appliance 101 outputs an error code through the display unit 118, or outputs a warning sound through the audio output unit 160 and notifies a user of occurrence of a failure (S1).

In this case, the home appliance 101 stores product information including operation information, failure information, and use information.

The user determines information of the home appliance 101 displayed in the display unit of the home appliance 101 and controls operation of the home appliance 101, or requests repair to the service center 200. The user notifies occurrence of a failure and inquires measures by communicating with the service center 200 (S2).

When the user connects to the service center 200 and manipulates a selection unit (not shown) of an input unit (not shown) provided in the home appliance 101 according to a request of the service center 200 (S3), the home appliance 101 modulates product information and outputs a predetermined sound through the audio output unit 160. The sound including product information and output in this way is transmitted to the service center 200 through a communication network (S4).

In this case, while the user notifies the service center 200 of model information and failure symptoms of the home appliance 101, by moving a phone 80 to a location, i.e., the audio output unit 160 that makes a sound in the home appliance 101 and transmitting a sound including product information of the home appliance to the service center 200 using the terminal 80 such as a mobile terminal or a phone, the user can request an after-sales service (A/S) of the home appliance 101.

When the service center 200 receives a sound through a connected communication network, for example, a phone network, the diagnosis server included in the service center 200 determines a sound output from the home appliance 101, determines a product state of the home appliance 101, and diagnoses whether a failure occurs (S5).

The service center 200 dispatches a service engineer 93 to the home to provide a service appropriate for a product state and a failure diagnosis of the home appliance 101 according to a diagnosis result (S6). In this case, a diagnosis result is transmitted to a terminal of the service engineer 93 (S6), and the service engineer can repair a failure of the home appliance 101.

Further, the service center 200 is connected to the user through a communication network and transfers a diagnosis result with voice to the user through a counselor or transmits predetermined data (S7).

Accordingly, when the user connects to the service center 200 through a predetermined communication network, for example, a phone network, the diagnosis system accurately determines a state of the home appliance 101 through a sound and transmits a diagnosis result to the user and thus a quick service can be performed and the user easily determines a state of the home appliance.

Hereinafter, the home appliance 101 of the present invention is, for example, the laundry processing device, but the present invention is not limited thereto and can be applied to the entire home appliance 101 such as a television, an air conditioner, a refrigerator, an electric rice cooker, and a microwave oven. In this case, the communication network is, for example, a phone network or a mobile communication network, and the terminal 80 is, for example, a phone or a mobile terminal.

The home appliance 101 includes the following elements and outputs product information as a predetermined sound.

Figure 2:
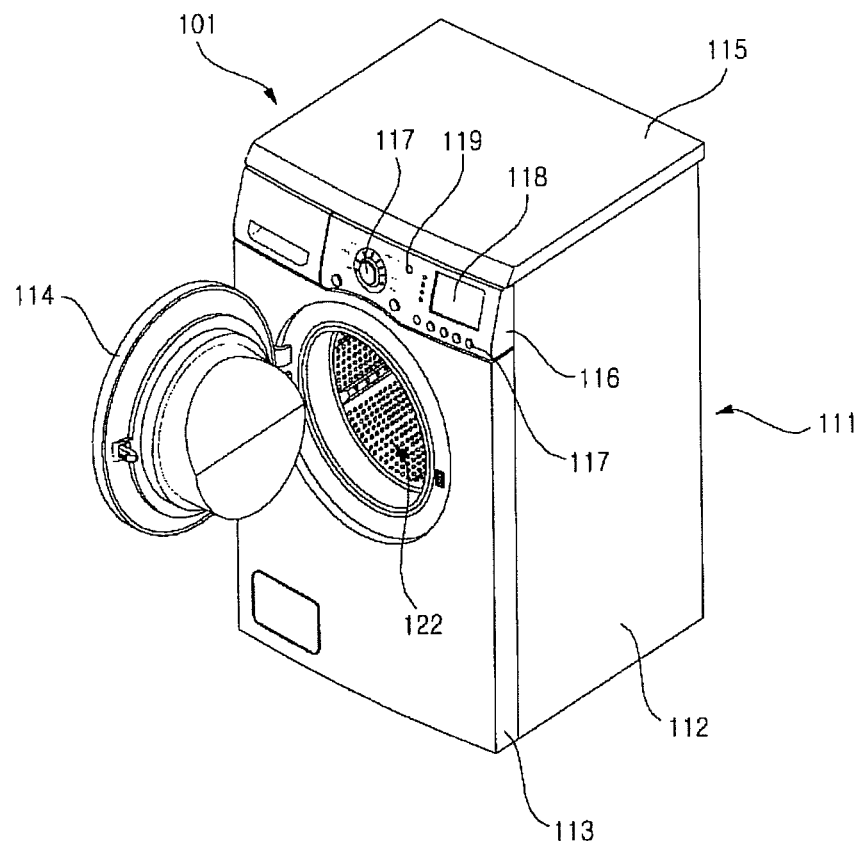
FIG. 2 is a perspective view illustrating a home appliance according to an exemplary embodiment of the present invention.

FIG. 2 is a perspective view illustrating a home appliance according to an exemplary embodiment of the present invention.

A laundry processing device as an example of the home appliance will be described.

Referring to FIG. 2A, as a home appliance according to an exemplary embodiment of the present invention, a laundry processing device 101 includes a cabinet 111, a tub 122 disposed within the cabinet and for washing the laundry, a motor (not shown) for driving the tub 122, a washing water supply device (not shown) for supplying washing water to the tub 122, and a drainage device (not shown) for discharging washing water to the outside when washing is terminated.

The cabinet 111 includes a cabinet body 112, a cabinet cover 113 disposed at and coupled to a front surface of the cabinet body 112, a control panel 116 disposed at an upper side of a cabinet cover 114 and for controlling operation of the laundry processing device 101, and a top plate 115 disposed at an upper side of the control panel 116 and coupled to the cabinet body 112. The cabinet cover 113 includes a hole (not shown) for injecting and discharging the laundry and a door 114 for rotating to open and close the hole.

In the control panel 116, an input unit including a plurality of manipulating keys 117 that manipulate operation of the laundry processing device 101 is disposed at the control panel 116, and the control panel 116 includes an audio output unit 160 for outputting an operation state of the laundry processing device 101 as a signal sound and a display unit 118 for displaying an operation state with a text, a numeral, a special symbol, and an image. The input unit includes an input means in which a manipulation key applies a predetermined signal by a press, a contact, a pressure, and a rotation in a form of a key, a button, a switch, a rotary switch, and a touch input means.

In this case, because a sound output from the audio output unit 160 is transmitted through a communication network using a terminal, it is preferable that the audio output unit 160 is disposed in consideration of a position at which a sound for communication is acquired, a position at which a reverberation phenomenon is minimized to raise a success rate of communication, and a position of a user communicating adjacent to a laundry machine. Further, the audio output unit 160 is disposed to advance a sound output direction toward a front surface of the laundry machine.

Accordingly, it is preferable that the audio output unit 160 is disposed at a position adjacent to a display panel of a control panel or the control panel 116, but a position thereof may be changed according to a form the laundry processing device and a kind of a model thereof.

In the laundry processing device 101, when the user performs a pressing manipulation of a selection unit provided in the control panel 116, a smart diagnosis mode entry instruction and a signal output instruction are input, by modulating product information to a control signal of a predetermined format and applying the control signal to a modulator (not shown), the laundry processing device 101 operates to correspond to the control signal and thus a predetermined sound is output through the audio output unit 160.

The sound output through the audio output unit 160 is transferred to the service center 200 through the terminal 80 connected to a predetermined communication network.

The service center 200 includes a diagnosis server, and as the sound output from the laundry processing device is received as a sound signal, the diagnosis server 200 analyzes the sound signal and acquires operation information and failure information of the home appliance 101. Accordingly, the service center diagnoses a state and a failure of the home appliance 101 and transfers a diagnosis result to the user or dispatches a service engineer.

Figure 3:
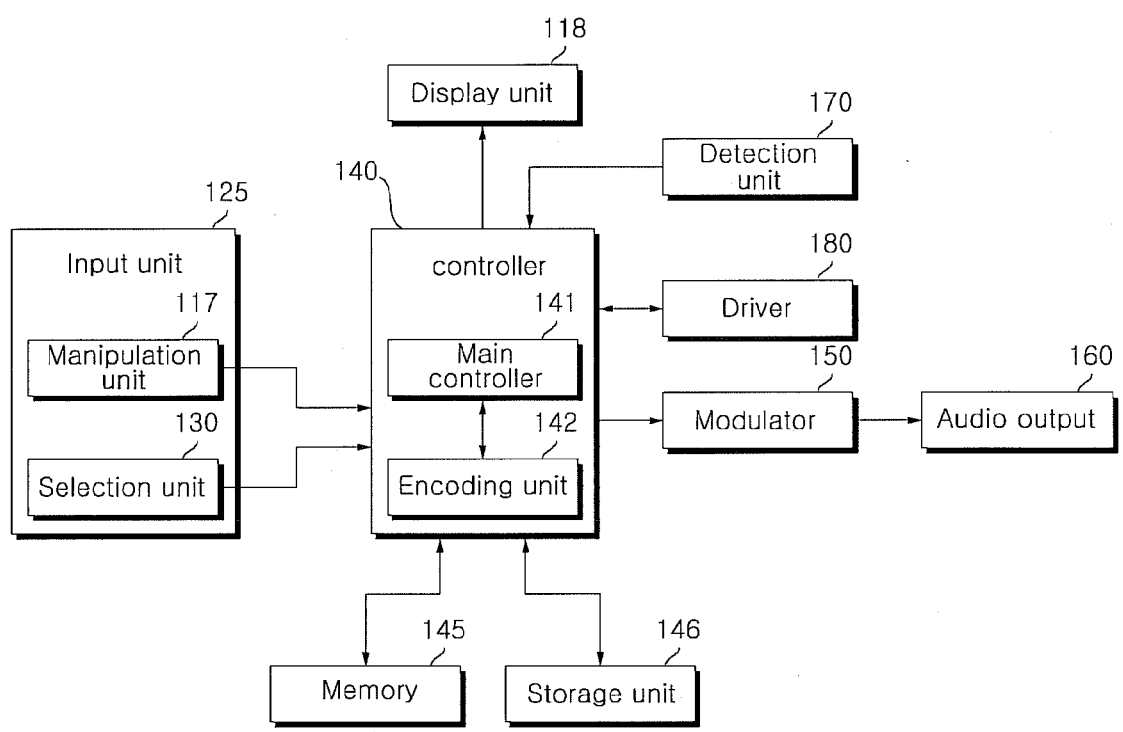
FIG. 3 is a block diagram illustrating a control configuration of a home appliance in the home appliance diagnosis system of FIG. 1.

FIG. 3 is a block diagram illustrating a control configuration of a home appliance in the home appliance diagnosis system of FIG. 1.

The home appliance 101 having the above-described configuration includes a control configuration for performing a stroke of wash, rinse, and spin of the laundry at the inside and for generating product information including data of a home appliance into a control signal of a predetermined format and processing data generated while operating, and for outputting as predetermined sound, when a smart diagnosis mode is set according to an input of the selection unit.

Referring to FIG. 3, the home appliance 101 includes an input unit 125, a detection unit 170, a memory 145, a storage unit 146, a driver 180, a modulator 150, an audio output unit 160, and a controller 140 for controlling entire operations of the home appliance.

The input unit 125 includes at least one input means for inputting a predetermined signal or data to the home appliance 101 by a user manipulation, a manipulation unit 117, and a selection unit 130.

The selection unit 130 includes at least one input means, and when a selection is input to enter a smart diagnosis mode, the selection unit 130 applies a signal output instruction to the controller 140 so that product information as a predetermined sound is output through the audio output unit 160.

In this case, the selection unit 130 may be formed as a separate input means in addition to the manipulation unit 117, and in some case, as at least two manipulation units 117 are simultaneously manipulated, the manipulation unit 117 may be operated or recognized as the selection unit 130, and when a specific manipulation unit 117 is continuously manipulated or for a predetermined time period, the specific manipulation unit 117 may be operated or recognized as the selection unit 130.

Further, when entering a smart diagnosis mode, the selection unit 130 enables the audio output unit 160 to turn on/off. That is, when a signal output instruction is input by the selection unit 130, a control signal including product information is output as a predetermined sound according to a control instruction of the controller 140, and in this case, the audio output unit 160 operates and outputs a sound.

The manipulation unit 117 receives data such as an operation course and operation setting according to operation of the home appliance 101 and applies the data to the controller 140. Further, the manipulation unit 117 receives an input of setting according to a sound output. That is, the manipulation unit 117 inputs a method of outputting a sound and a setting value that sets the magnitude of the output sound.

In this case, the input unit 125 including the selection unit 130 and the manipulation unit 117 may be one of a button, a dome switch, a touch pad (resistive/capacitive), a jog wheel, a jog switch, a finger mouse, a rotary switch, and a jog dial and may be a device that generates predetermined input data by a manipulating such as press, rotation, pressure, and contact.

The detection unit 170 includes at least detection means for detecting a temperature, a pressure, a voltage, a current, a water level, and the rotation number, and applies detected or measured data to the controller 140. For example, the detection unit 170 measures a level of water when the laundry processing device supplies or discharges water, and measures a temperature of supplied water, and a rotation speed of a washing tub or a drum.

The driver 180 controls operation of the home appliance 101 to perform a setting operation according to a control signal applied from the controller 140. Accordingly, the laundry processing device performs a series of strokes such as a wash stroke, a rinse stroke, a spin stroke and removes stains of the laundry.

For example, in the laundry processing device, in order to remove stains from the laundry by a rotation of the washing tub or the drum, the driver 180 drives a motor for rotating the washing tub or the drum and controls an operation thereof. Further, the controller 140 controls a valve to supply or discharge water according to a control instruction.

The memory 145 stores control data for controlling operation of the home appliance 101 and reference data to be used for operation control of the home appliance.

In this case, the memory 145 includes data storage means such as ROM and EEPROM for storing control data for the home appliance. The storage unit 146 is a buffer of the controller 140, is a storage means for temporarily storing data, may use DRAM and SRAM, and may be included in the controller 140 or the memory 145 in some case.

The memory 145 stores operation state data generated while the home appliance 101 performs a predetermined operation, operation information such as setting data input by the manipulation unit 117 so that the home appliance 101 performs a predetermined operation, use information including the number of times in which the home appliance 101 performs a specific operation and model information of the home appliance, and failure information including information about a cause or an operation of an erroneous operation when the home appliance 101 performs an erroneous operation.

That is, the memory 145 stores product information including operation information, use information, and failure information. The storage unit 146 also stores temporary data about operation information and failure information generated while operating. For example, product information may include the number of use, a setting course, option setting information, an error code, a sensor measurement value, calculation data of the controller, and operation information of each unit of a laundry machine.

When a signal according to entry of a smart diagnosis mode is input from the selection unit 130, the controller 140 generates a control signal in a predetermined format by calling product information stored at the memory 145 or the storage unit 146 and applies the control signal to the modulator 150. Further, as the selection unit 130 is manipulated, the controller 140 controls the audio output unit 160 to operate.

The controller 140 includes a main controller 141 for controlling a flow of data input or output to the home appliance, and generating and applying a control instruction according to data input from the detection unit 170, or for controlling to operate the home appliance by transferring the detected data to the driver 180 and an encoding unit 142 for modulating product information to a control signal of a predetermined format in order to output a sound according to an input of the selection unit 130.

When being entered a smart diagnosis mode by an input to the selection unit 130, the main controller 141 controls the audio output unit 160 to output a start sound notifying that a smart diagnosis mode is started and controls the display unit 118 to display predetermined data notifying that a smart diagnosis mode is performed.

Further, as a control signal generated in the encoding unit 142 is applied to the modulator 150, when the audio output unit 160 outputs a sound, the main controller 141 controls the audio output unit 160 to output a predetermined notification sound before an output of sound and after an output of sound is complete. However, a notification sound before an output of sound may be omitted.

In this case, when at least two audio output units 160 exist, the main controller 141 controls different audio output units 160 to output a notification sound and a sound including product information.

When entering a smart diagnosis mode, the main controller 141 controls the manipulation unit 117 not to operate, except for the selection unit 130 and a power key and controls the detection unit 170 and the driver 180 so that the home appliance stops all other operations.

Further, after power is input, when one manipulation key of the manipulation unit 117 is input according to operation setting of the home appli, even if the selection unit 130 is input, the main controller 141 controls a smart diagnosis mode not to start. Particularly, when the selection unit 130 is not separately provided and it is recognized that the selection unit 130 is input by a combination of at least two of a plurality of manipulation keys of the manipulation unit 117, if the selection unit 130 is input by a designated key combination without another input after a power key input, the main controller 141 controls a smart diagnosis mode to be started.

It is determined that the user does not have an intention to enter a smart diagnosis mode with operation setting of the home appliance by the manipulation unit, and thus the home appliance does not enter a smart diagnosis mode and it is prevented from unnecessarily entering a smart diagnosis mode due to a manipulation mistake of the manipulation unit.

The encoding unit 142 encodes according to a designated method by calling product information stored at the memory 145 and generates a control signal of a predetermined format by adding a preamble and an error check bit to a data signal. The encoding unit 142 generates a control signal formed with a plurality of symbols by encoding product information.

In order to cope with a data damage problem that may occur in a process of outputting product information with a sound and transmitting through a communication network, the encoding unit 142 encodes product information by applying an error coding method for restoring a bit error. The encoding unit uses, for example, a Forward Error Correction (FEC) encoding method. In this case, the encoding unit 142 encodes product information using a convolution code. Here, the diagnosis server of the service center decodes using Viterbi decoding algorithm according to such an encoding method.

Further, when generating a control signal, the encoding unit 142 divides the control signal into a predetermined size and forms the control signal in a frame, and forms a packet with a plurality of frames. Further, the encoding unit 142 can set a predetermined time IFS between frames with the control signal, and when modulating a signal, the encoding unit 142 may set a dead time to a symbol at a segment in which a data value is changed in order to remove a reverberation effect that influences on a next signal modulation due to a charge and discharge principle of a capacitor.

With respect to a plurality of symbols constituting a control signal, a length of each symbol is referred to as a symbol time, and with respect to a sound output through the audio output unit 160 to correspond to a symbol, when a basic length of a frequency signal constituting the sound is also referred to as a symbol time, the encoding unit 142 may set a dead time within a symbol time of one symbol. In this case, the dead time has a variable size according to a length of a symbol time.

Here, as described above, product information includes operation information including operation setting and an operation state while operation, use information, and failure information about an erroneous operation. Product information is data formed with a combination of 0 or 1 and is a digital signal of a format that can be read by the controller 140.

The controller 140 classifies data of such product information, controls to include specific data, generates a control signal of a designated specification by dividing or adding in a predetermined size, and applies the control signal to the modulator 150.

Further, the controller 140 changes the number of symbols corresponding to an output frequency signal according to the number of frequencies used in the modulator 150.

By applying a predetermined driving signal to the audio output unit 160 to correspond to a control signal applied from the controller 140, the modulator 150 enables a sound to output through the audio output unit 160. The sound output in this way includes product information.

With respect to a symbol constituting a control signal, the modulator 150 applies a signal to the audio output unit 160 so that a designated frequency signal is output for a symbol time to correspond to one symbol.

In this case, the modulator 150 controls to output a sound to correspond to a control signal using a plurality of frequency bands, and changes and outputs the number of symbols per frequency signal according to the number of use frequencies to correspond to setting of the controller 140. For example, when 2 frequencies are used, one frequency signal may be output per 1 symbol, and when 4 frequencies are used, one frequency signal may be output per 2 symbols of a control signal.

The modulator 150 includes a frequency oscillation unit (not shown) that generates an oscillation frequency on a frequency basis to correspond to the number of available frequencies, and controls to output a frequency signal of a designated frequency oscillation unit through the audio output unit 160 according to a control signal.

When controlling the audio output unit 160 to output a sound according to a control signal of the controller 140, the modulator 150 modulates a signal using one of a frequency deviation method, an amplitude deviation method, and a phase deviation method.

Here, the frequency deviation method is a method of modulating to a signal of a predetermined frequency according to a data value of a control signal, and the amplitude deviation method is a method of differently modulating a magnitude of an amplitude according to a data value. Further, the phase deviation method is a method of modulating a signal to have different phases according to a data value.

Figure 11:
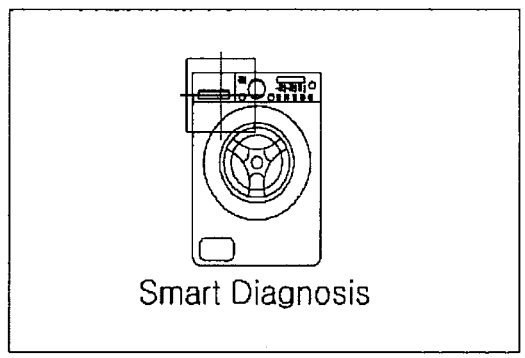
FIGS. 11 to 15 are diagrams illustrating an example of a screen in which a method of operating a home appliance is displayed in a display unit of a home appliance according to an exemplary embodiment of the present invention.
Figure 11:
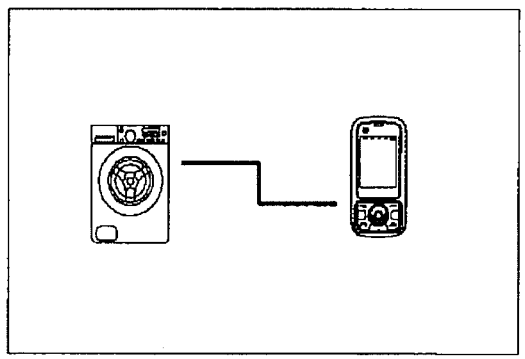

In Binary Frequency Shift Keying (hereinafter, BFSK) of a frequency deviation method, when a data value of a control signal is 0, the control signal is modulated with a first frequency, and when a data value is 1, the control signal is modulated with a second frequency. For example, when a data value is 0, the control signal is modulated to a signal having a frequency of 2.6 KHz, and when a data value is 1, the control signal is modulated to a signal having a frequency of 2.8 KHz. This is the same as that shown in FIG. 11.

Further, in the amplitude deviation method, the control signal is modulated to a signal having a frequency of 2.6 KHz, but when a data value of the control signal is 0, the control signal is modulated to a signal having a frequency of 2.6 KHz having an amplitude magnitude of 1, and when a data value is 1, the control signal is modulated to a signal having a frequency of 2.6 KHz having an amplitude magnitude of 2.

It is exemplified that the modulator 150 uses a frequency deviation method, but this can be changed. Further, a used frequency band is also an example and can be changed.

When a dead time is set to the control signal, the modulator 150 stops a signal modulation at a segment in which a dead time is set. In this case, when modulating a signal using a pulse width modulation (PWM) method, by turning off an oscillation frequency for modulation at a segment in which a dead time is set, the modulator 150 pauses a frequency signal modulation for a dead time. Accordingly, a reverberation effect between a symbol and a symbol of a sound output through the audio output unit 160 is controlled.

The audio output unit 160 is turned on and off according to a control instruction of the controller 140 and outputs a signal of a predetermined frequency corresponding to a control signal for a designated time by the control of the modulator 150, and thus outputs a predetermined sound including product information.

In this case, at least one audio output unit 160 may be provided. For example, when two audio output units are provided, a predetermined sound including product information may be output through one audio output unit and a warning sound or an effect sound corresponding to state information of the home appliance may be output through another audio output unit, and a notification sound before outputting a sound or when entering a smart diagnosis mode may be output.

After the audio output unit 160 outputs a control signal with a predetermined sound to correspond to an output from the modulator 150, when the output is terminated, operation thereof is stopped, and when the selection unit 130 is manipulated again, the audio output unit 160 is operated again via the above process, and thus the audio output unit 160 outputs a predetermined sound including product information.

In this case, the audio output unit 160 may use a means for outputting a sound such as a speaker and a buzzer, but it is preferable that a speaker having a wide reproduction band is used for using a plurality of frequency bands.

Further, when entering a smart diagnosis mode, the audio output unit 160 outputs a start sound notifying that a smart diagnosis mode is started according to a control instruction of the main controller 141 and outputs the respective predetermined notification sound when an output of a sound including product information is started and terminated.

The display unit 118 displays information that is input by the selection unit 130 and the manipulation unit 117, operation state information of the home appliance 101, and information according to operation completion of the home appliance on a screen according to a control instruction of the main controller 141. Further, when the home appliance erroneously operates, the display unit 118 displays failure information about an erroneous operation display on the screen.

Further, when a smart diagnosis mode is started according to a control instruction of the main controller 141, the display unit 118 displays a smart diagnosis mode, and when a sound is output through the audio output unit 160, the display unit 118 displays a progress situation in a form of at least one of a text, an image, and a numeral.

In this case, the home appliance may further include an output means such as a lighting or flickering lamp and a vibration element in addition to the audio output unit 160 and the display unit 118, but a description thereof will be omitted.

The home appliance 101 having the above configuration outputs a predetermined sound and transfers product information of the home appliance 101 to the service center 200, as described above.

Figure 4:
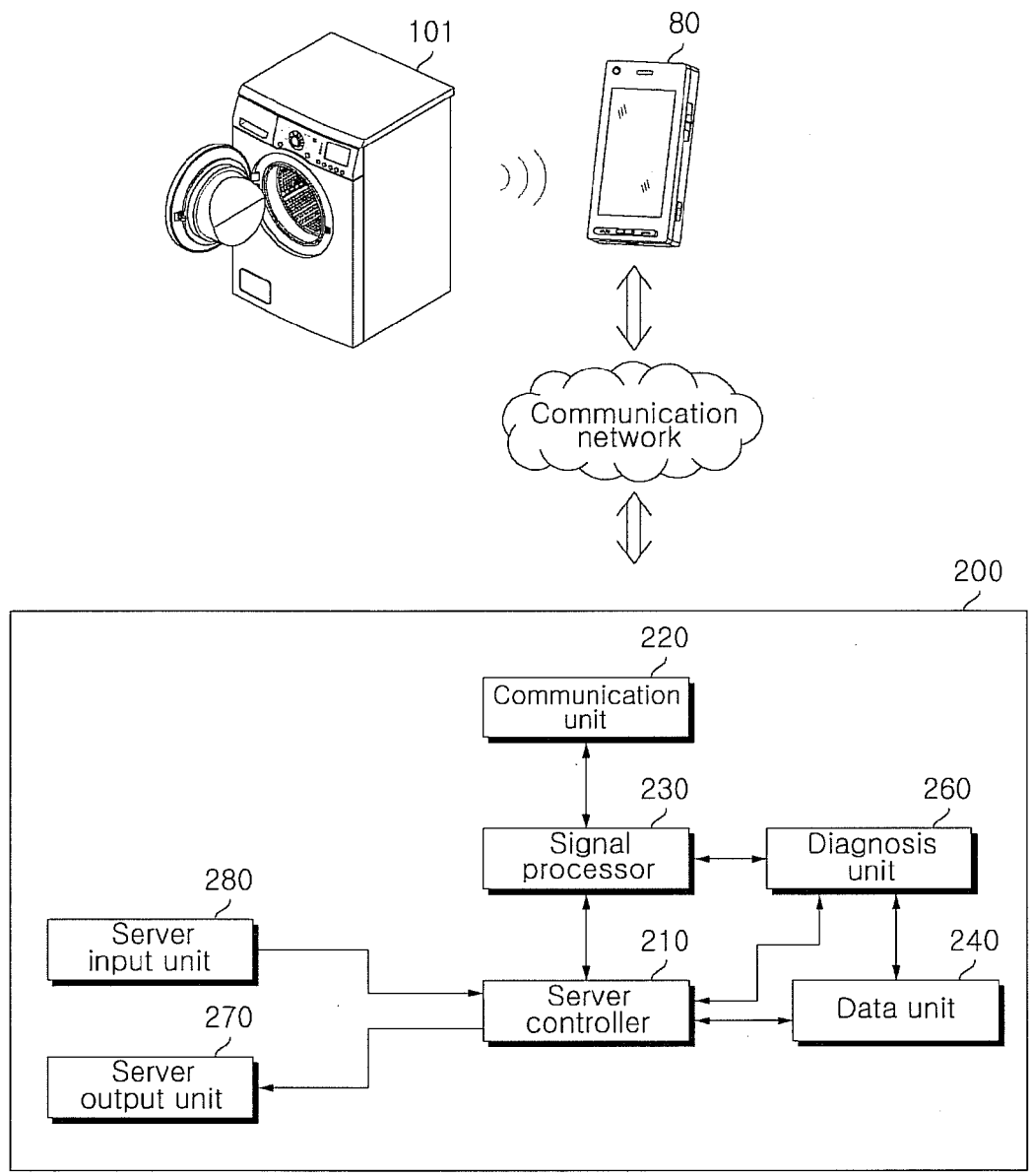
FIG. 4 is a block diagram illustrating a configuration of a diagnosis server of a service center in the home appliance diagnosis system of FIG. 1.

FIG. 4 is a block diagram illustrating a configuration of a diagnosis server of a service center in the home appliance diagnosis system of FIG. 1.

When a predetermined sound is output from the home appliance 101, the output sound is input to the terminal 80 of the user and is transmitted to the service center 200 through a communication network. The service center 200 receives a sound signal of the sound, applies the sound signal to the diagnosis server, and performs a failure diagnosis of the home appliance.

As shown in FIG. 4, the diagnosis server of the service center 200 includes a communication unit 220, a signal processor 230, a data unit 240, a server input unit 280, a server display unit 270, a diagnosis unit 260, and a server controller 210 for controlling entire operations of the diagnosis server.

In order for a manager, a user, and a service engineer of the service center to check a diagnosis progress situation of a diagnosis result, the server input unit 280 and the server output unit 270 provide a predetermined input and output interface and receive an input of data or output data.

The server input unit 280 includes an input means such as a button, a key, a touchpad, and a switch manipulated by the user of the service center 200. The server input unit 280 includes a connection interface for an external input device and a portable memory means.

When a provided input means is manipulated, the server input unit 280 applies a signal to the server controller 210 and enables a sound signal of a sound of the home appliance 101 to be received to the diagnosis server from a mobile terminal or a phone of the user connected through a phone network.

The server output unit 270 includes a display means for outputting operation information and a diagnosis result of the diagnosis server.

The communication unit 220 is connected to a computing network of the service center 200 to transmit and receive data and is connected to and communicates with an outside network such as Internet. Particularly, when receiving a recording instruction or a receiving instruction through the server input unit 280 according to a control instruction of the server controller 210, the communication unit 220 receives a sound output from the home appliance as a sound signal through a phone network and transmits a diagnosis result to the outside when a diagnosis is complete.

The communication unit 220 transmits the diagnosis result to a terminal of a service engineer, or transmits the diagnosis result to the user's terminal.

Control data for an operation control of the diagnosis server and a sound signal received from a home appliance such as a laundry processing device as signal sound data are stored in the data unit 240, and reference data for modulation of a sound signal or a sound and extraction of product information and failure diagnosis data for diagnosing a failure and a failure cause are stored.

Further, the data unit 240 stores temporary data generated in a process of a change of received data or detection of product information and stores a diagnosis result report for transmitting diagnosis result data and a diagnosis result to the user.

In the data unit 240, an input and output of data are controlled, managed, and updated by the server controller 210.

The signal processor 230 applies product information modulated and extracted to read a received sound signal to the diagnosis unit.

The signal processor 230 modulates and stores a received analog sound signal. In this case, a signal modulation in the signal processor 230 is inverse modulation to signal modulation in the home appliance 101 and it is preferable that each home appliance and the diagnosis server modulate data through the same signal modulation system as a signal modulation system that uses in a home appliance through mutual agreement. The signal processor 230 modulates a signal sound, which is an analog signal of a predetermined frequency band to a digital signal through inverse modulation using one of a frequency deviation method, an amplitude deviation method, and a phase deviation method.

Further, the signal processor 230 extracts a control signal in a frame unit from modulated data and extracts product information by decoding a control signal. In this case, the signal processor 230 detects a preamble, detects a control signal including product information based on the detected preamble, and extracts product information of the home appliance included in the control signal by decoding a control signal of a designated format with a decoding method corresponding to a product information encoding method of the home appliance.

The signal processor 230 modulates and analyzes a signal based on a structure or format information, a frequency characteristic, and decoding information of the control signal stored in the data unit 240.

Such detected product information is applied to the diagnosis unit 260 and is stored at the data unit 240.

The diagnosis unit 260 analyzes input product information according to a control instruction of the server controller 210, and diagnoses an operation state and a failure of the home appliance. The diagnosis unit 260 includes a diagnosis program for product information analysis of the home appliance and state determination of the home appliance according to product information and diagnoses the home appliance using failure diagnosis data stored in the data unit 240.

Further, the diagnosis unit 260 analyzes a cause of an occurred failure, derives an solution or measures thereof, and outputs a diagnosis result for a customer service direction.

In this case, the diagnosis unit 260 classifies data of product information according to a predetermined reference and performs a failure diagnosis according to a combination of related data. Further, the diagnosis unit 260 determines a portion in which an accurate diagnosis can be performed and a portion in which an accurate diagnosis cannot be performed, performs a failure diagnosis, and performs a failure diagnosis in order of a high probability according to a failure probability in reasoning diagnosis items.

The diagnosis result includes a failure system, a list of failure causes according to a probability, and a list of failure parts, and guide information about dispatch of a service engineer.

The server controller 210 controls transmission and reception of data through the communication unit 220, and controls an input and output of data through the server input unit 280 and the server output unit 270. Further, the server controller 210 controls operation of the signal processor 230 and the diagnosis unit 260 to perform a failure diagnosis of the home appliance. Further, the server controller 210 controls to output a diagnosis result of the diagnosis unit 260 through the server output unit 270 and additionally controls to transmit a diagnosis result through the communication unit 220.

The server controller 210 controls to output the diagnosis result of the diagnosis unit 260 through the server output unit 270. Accordingly, the service center 200 transfers measures according to an erroneous operation of the home appliance 101 with voice to the user connected through a phone network, or dispatches a service engineer. When the service engineer is dispatched, the server controller 210 transmits a diagnosis result to a terminal of the service engineer through the communication unit 220.

Further, the server controller 210 applies the diagnosis result to the communication unit 220 and enables the diagnosis result to transmit to a user.

When an error occurs in a signal processing or a diagnosis process, the server controller 210 controls to output a message or a warning sound that requests to output again a sound from the home appliance through the server output unit 270. In this case, the service center 200 requests to output again a sound from the home appliance to the user connected through the communication network.

A plurality of data for operation of the home appliance are included in product information of the home appliance modulated and transmitted to a sound for a failure diagnosis of the home appliance. The home appliance stores a plurality of diagnosis data necessary for a failure diagnosis, and such product information will be described.

As described above, the electronics device stores product information at the memory 145, and the product information includes a plurality of diagnosis data.

The main controller 141 stores each diagnosis data at the memory 145, or temporarily stores each diagnosis data at the storage unit 146 and formally stores at the memory 145 according to a progress state of operation of the home appliance. The main controller 141 changes a storage time and a storage frequency of data according to a kind of diagnosis data and controls to store the data at the memory.

Diagnosis data stored in this way are read by the main controller 141 upon entering a smart diagnosis mode, are read as product information in the encoding unit 142, are encoded as a control signal of a predetermined form, are modulated through the modulator 150, and are output with a sound through the audio output unit 160.

In the laundry processing device, operation information includes information necessary for operation of the laundry processing device such as information about a wash stroke of the laundry processing device, information about a spin stroke, and information about a rinse stroke.

Further, when operation of the laundry processing device is performed, failure information may include various information such as failure information generated while each operation is performed, failure information of a device of the laundry processing device, an error code corresponding to failure information, information of the controller 140, a value detected in the detection unit 170, a detection value of a motor, failure information of a washing water supply device, and failure information of a drainage device.

Use information may include various information such as the number of times in which the user uses the laundry processing device, a course in which the user sets, and option setting information set to the laundry processing device. That is, use information may include contents input to the laundry processing device from the user or information initially set to the laundry processing device.

Further, product information is stored in a size of Table 1.

TABLE 1

| Category | Name | Size (byte) |
| --- | --- | --- |
| Operation info | Status | 1 |
| Customer info | Common | 11 |
| | Wash | 4 |
| | Rinse | 4 |
| | Spin | 6 |
| | Dry | 8 |
| | Error code | 1 |
| | Counts | 8 |
| | Options | 9 |

Referring to Table 1, a category indicates an attribute of product information. Further, a name indicates a meaning of each category.

Hereinafter, in more detail, a state indicates a stroke finally performed in entire strokes of the laundry processing device 101. That is, when the laundry processing device 101 performs a wash stroke, a spin stroke, and a rinse stroke, if the user finally performs a rinse stroke, the state indicates product information when performing a rinse stroke. In this case, the state has a size of 1 byte.

Common indicates product information having an attribute of sampling over entire strokes of the laundry processing device 101. That is, when the motor and the laundry number supply device operate over entire strokes of the laundry processing device, the common indicates product information at a predetermined time point or at the above each stroke. The common is set to have a size of 11 bytes.

Further, wash indicates product information having an attribute of sampling in a wash stroke. For example, when a wash stroke is performed, wash indicates product information having an attribute to sample a level of washing water or an operating time of a washing water supply apparatus. The wash is set to have a size of 4 bytes. Data of wash are stored when a wash stroke is performed or when a wash stroke is complete and are stored even when an error occurs. In this case, when spin finally performed in a wash stroke is complete, it is regarded as the wash stroke is complete, before rinse is started, i.e., before water supply of the rinse stroke is started, diagnosis data on wash are stored.

Rinse indicates product information having an attribute of sampling in the rinse stroke. Rinse is formed to have a size of 4 bytes. Data of rinse are stored when rinse is complete, or when an error occurs while performing the rinse stroke, and are each stored according to rinse counts and diagnosis data of rinse are finally stored after spin of final rinse and before start of the spin stroke.

Further, spin indicates product information having an attribute of sampling in a spin stroke. In this case, spin is set to have a size of 6 bytes. Diagnosis data of spin are stored when the spin stroke is complete or when an error occurs while performing the spin stroke.

Dry indicates product information having an attribute of sampling in a dry stroke. Dry is formed to have a size of 8 bytes.

In wash, rinse, and spin strokes, diagnosis data of bubble detection are immediately stored when a bubble is detected.

An error code is a code that displays warning when an error is detected while the laundry processing device 101 operates. That is, an error code is a code that displays a failure to the outside in order for the user to recognize a failure when the laundry processing device 101 is in a failure state. For example, when a failure occurs in the laundry processing device 101, if a use error occurs, an error code indicates an error message or a warning sound emitted to the outside through a display unit (not shown) or a buzzer. In this case, the error code is formed to have a size of 1 byte.

For example, when a failure occurs in the laundry processing device 101, if a use error occurs, an error code indicates an error message or a warning sound emitted to the outside through a display unit (not shown) or a buzzer. Such an error code in diagnosis data, i.e., an error code of product information is set to know a portion in which an error occurs when operation of the home appliance has an error. In this case, the error code is displayed through the display unit or is output by a warning sound.

For example, when a data value of an error code included in product information is 0, it represents that the home appliance has no error or has an error that is not classified as an error code. When a data value of the error code is 1, it represents that a door has an error, when a data value of the error code is 2, it represents that water supply has an error, when a data value of the error code is 3, it represents that drainage has an error, when a data value of the error code is 4, it represents that balance has an error, when a data value of the error code is 5, it represents that FE has an error, when a data value of the error code is 6, it represents that a water level sensor (PE) has an error, when a data value of the error code is 7, it represents that water supply (IE) has an error, when a data value of the error code is 8, it represents that a motor (LE) has an error, when a data value of the error code is 9, it represents that CE has an error, and when a data value of the error code is 10, it represents that dry (dhe) has an error. An error of a specific system according to an allocated value may be represented by an error code.

Such an error code is used for extracting related data according to a value of an error code when the diagnosis server diagnoses a failure, comparing the extracted data with reference data or diagnosis data, analyzing a failure cause, and deriving measures of a failure cause. Further, the diagnosis server determines whether an error occurs when the home appliance performs which operation based on state information included in product information.

Counters indicate product information including the number of times in which the user uses the laundry processing device 101 and the number of times in which an error occurs. Counters are formed to have a size of 8 bytes. When operation of the home appliance is started, counters are not initialized and sustain existing data in a preliminary step.

Further, when the user operates the laundry processing device 101, options indicate product information including various options set by the user. Options are set to the laundry processing device 101 by the user, and for example, options are set as a wash time 15 minutes, spin time 5 minutes, and rinse time 10 minutes. In this case, options are formed to have a size of 9 bytes. Options are stored when an error code occurs or when a wash stroke is complete.

Each size, category, and name described above are an example. Therefore, each size, category, and name may be differently formed according to a characteristic of the home appliance.

The main controller 141 controls to operate the home appliance according to a setting value of an operation course or an option that is set through the manipulation unit 117 of the input unit 125, and for example, in a laundry processing device, operation is classified into preliminary operation, wash, rinse, spin, dry, and termination steps, and operation in each step is subdivided and operation in which the home appliance finally performs is stored as state information.

State information includes information about operation step finally performed in entire operations of the home appliance. For example, before performing a designated operation in the laundry processing device, state information is classified into preliminary operation step, wash step, rinse step, spin step, dry step, and completion step and includes information about operation in which the laundry processing device finally performs. In this case, each step may be subdivided. For example, wash step may be classified into rough wash, soak wash, main wash, and after wash, and rinse step may be classified into first rinse, second rinse, third rinse, and fourth rinse. Further, state information includes subdivided operation information of the home appliance such as drain step of first rinse, simple spin step of first rinse, main spin step of first rinse, and water supply step.

When an error occurs in the rinse stroke of the laundry processing device, a finally performed operation is operation related to the rinse stroke and thus a value representing the rinse stroke is stored in state information. In this case, each stroke is subdivided, and state information may represent whether an error occurs in which rinse of rinses, whether an error occurs in a spin process of rinse, whether an error occurs in water supply, or whether an error occurs in drainage.

In this case, state information has a size of about 1 byte, and classifies steps of each operation of the home appliance into about 60 to 64 steps, and includes information about each operation.

In this case, state information having a value of 0 to 5 indicates a preliminary operation step, and 0 indicates a standby state in which power is turned off, 1 indicates an initialization step, 2 indicates a stop step, 3 indicates a reservation step, 4 indicates a freezing detection step, and 5 indicates a quantity detection step of the laundry. Further, 55 and 56 indicate dry steps, and 55 indicates strong wind dry of dry, and 56 indicates cooling down step.

Further, 6 to 9 indicate a rough wash stroke, 10 to 11 indicate a socking stroke, 12 to 20 indicate a wash stroke, 21 to 48 indicate a rinse stroke, 49 to 52 indicate a spin stroke, 55 and 56 indicate a dry stroke, and 57 to 59 indicate a termination stroke. State information having a data value of 0 represents a state in which power is turned off, and a data value of 12 represents that wash initial water supply is a finally performed operation in a wash stroke. Further, state information having a data value of 28 represents that simple spin in a second rinse process is a finally performed operation.

Such state information is frequently updated while operating the home appliance. That is, when the wash stroke is performed, state information thereof is stored, and when the wash stroke is complete and the rinse stroke is performed, a value thereof is stored as state information.

Accordingly, because the diagnosis server can determine operation in which the home appliance finally performs through state information included in product information, the diagnosis server performs a failure diagnosis using diagnosis data related thereto.

In the common data, as soon as data occur or a value of data is changed, common data are stored from time to time at the storage unit 146. After such common data are temporarily stored at the storage unit 146, as all operations are complete or an error occurs in operation, when operation is stopped, common data are stored at the memory 145.

A current limit counter is the number of times in which a current limitation occurs and after the home appliance operates, until operation of the home appliance is terminated, counters in which a current limitation occurs are accumulated and stored. One time is counted in one cycle in which a motor is turned on and off.

Here, when a motor controller generates a signal for controlling a motor and applies the signal to the motor, if a current of a range deviating from a current range in which the motor controller can accept occurs, in order to prevent the motor controller and the motor from being damaged due to an overcurrent, a limitation value is set, and when a current value arrives the limitation value, operation is forcedly controlled and a current is intercepted.

An overcurrent control counter (F0 Counter) is a value counted when an overcurrent is intercepted by hardware, and values counted until termination from the start of operation are accumulated. In this case, F0 Counter is to limit an overcurrent by hardware, and when the motor controller normally controls, a value sustains 0. Therefore, when F0 Counter is 0, it is determined that the motor controller is normal, and when F0 Counter is not 0, it is determined that the motor controller has an error.

A Bubble_Counter is a bubble detection counter, and a bubble detection counter from the start of operation to termination thereof is accumulated and stored.

A rotation speed measured value (RPM Detect) is a value in which a hole sensor provided in a motor measures a rotation speed according to operation of the motor. This is data that can check an error of the motor or an error of the hole sensor. For example, when a rotation speed measured value is 0 and a rotation speed is not detected, if a current limit counter is not 0, the motor actually operates, but because an error occurs in the hole sensor, it is determined that a rotation speed is not measured.

In this case, if a rotation speed measured value is 0, the hole sensor is normal, and if a rotation speed measured value is 1, rpm of the motor is 0, and if a rotation speed measured value is 2, it represents that after the motor is operated, rpm of the motor is continuously 0 for final 2 seconds, or rpm of the motor is not 0 at least once for the remaining time.

When being detected, the rotation speed measured value is stored from time to time and in time, and a finally stored value is finally sustained.

Power off info includes information about whether the home appliance is terminated after all setting operations are complete or whether the home appliance is terminated when some operation is not performed, when power is turned off. For example, when power is turned off due to a power failure, a value of power off info may be 1.

Water Level End includes a water level measured value of the tub when operation of the home appliance is terminated.

Error Water Drain Time indicates a time consumed for drainage and particularly, when an error occurs, a finally stored drainage time is stored. In this case, a drainage time when an error occurs is changed when drainage is performed, and a large value of a previously stored value and a newly measured value is stored. That is, a maximum time of times taken for drainage is stored, and when a drainage operation is performed several times, the largest drainage time is stored.

An error water drain time is a maximum time of operating times according to drainage upon draining, and when a drain operation is performed, a drain time is measured, and if an Error Water Drain Time is larger than a previously stored value, the error water drain time is stored, and the maximum time is stored as an error water drain time.

A motor controller maximum temperature (IPM Max Temperature) is a measurement temperature of a motor controller that applies a control signal to a motor. In a process in which the motor controller generates and applies a motor control signal, because an calculation amount is much, an amount of emitted heat is large, and thus when a temperature becomes a predetermined value or more, the motor controller may be damaged, thereby measuring and recording a temperature of the motor controller.

When an error occurs in a temperature, an error temperature includes information when a plurality of temperature sensors provided in the home appliance detect an error temperature or information of the temperature sensor that detects an error. For example, when a value of an error temperature is 0, it represents that the temperature sensor has no error, when a value of an error temperature is 1, it represents that a temperature sensor provided in the tub detects an error temperature, when a value of an error temperature is 2, it represents that a temperature sensor provided in the AF detects an error temperature, and when a value of an error temperature is 3, it represents that a temperature sensor provided in the duct detects an error temperature. In this case, the order or the kind of the temperature sensor corresponding to a value of an error temperature can be changed according to setting.

That is, an error temperature 1 represents that an error temperature is detected in the temperature sensor provided in the tub.

In this case, a temperature detection unit provided in the home appliance applies predetermined data corresponding to the detected temperature to the main controller. In this case, a value input to the main controller is not a value of a measured temperature, but is a value that divides one of resistance, a current, and a voltage value corresponding to a temperature into 255 levels.

When the measured value of the temperature detection unit is 0 or 255, this has a problem in a connection or disconnection and is a value that cannot display in a normal state and thus when a measured value of the temperature detection unit is 0 or 255, the main controller determines that a corresponding temperature sensor has an error. Alternatively, even when the measured value of the temperature detection unit exceeds a temperature range in which the temperature detection unit can detect, 0 or 255 may be applied to the main controller. In the laundry processing device, when a fan has an error, due to overheating in a temperature detection unit provided in a dry heater, a measurement limit of temperature detection unit is exceeded, error data are applied to the main controller. Accordingly, the main controller stores information of a corresponding temperature detection unit as an error temperature.

An error bubble flag is a value representing whether a bubble is detected when an error occurs, and when a bubble is detected, the error bubble flag is set, and when a bubble is removed, setting of the error bubble flag is released.

An error voltage is a voltage value measured when an error occurs and is stored. An error voltage of this time is not stored as a generally measured voltage value, but a measured voltage is divided into a plurality of levels, and a modulated value displayed in a level is stored.

An error fan motor rotation speed (fan motor rpm) is a rotation speed value of a fan motor when an error code occurs and is stored. Before operation of the fan motor is stopped, the value is measured and stored and then the fan motor is stopped.

A rotation speed value when entering cooling down is stored as a value that measures a rotation speed of the dry fan in the laundry processing device.

A rewater flag is set while a rewater operation is performing, and when a rewater operation is complete, the rewater flag is cleared. At an error or termination time point, a value is stored. In this case, only rewater is set regardless of whether wash step or rinse step.

A door bimetal flag stores an on-off signal of a bimetal of the door side when an error related to a door occurs.

As described above, data used in entire operations of the laundry processing device are temporarily stored from time to time, are updated, and are stored at the memory when an error occurs or when operation is terminated.

In diagnosis data, data corresponding to operation are stored according to an operation state.

At a wash stroke step, a wash water supply time, a wash water temperature, a wash bubble flag, a wash low voltage flag, a wash valve modulation flag, a heater compulsive termination flag are each stored. The data are temporarily stored and updated at a wash stroke, and are stored at the memory when wash is complete.

In this case, water supply time_W is a time consumed for supplying water when initially supplying water for wash and is a time from start of water supply to completion of water supply. A temperature of the tub when starting operation and a temperature of the tub immediately after initial water supply is complete are stored as a first wash water temperature and a first wash water temperature, respectively. The first wash water temperature (water temperature W0) is a temperature of the tub measured when starting operation in a wash stroke, i.e., as soon as water supply is started. In this case, a temperature is not measured at restart after stop. The second wash water temperature (water temperature W1) is stored by measuring a temperature of the tub immediately after initial water supply is complete. In this case, because a temperature of the tub is changed according to a temperature of wash water when supplying water, the temperature of the tub is regarded as a temperature of wash water. When two wash water temperatures are compared, a water supply state and an error of a sensor may be determined.

The wash bubble flag represents whether a bubble occurs at wash and spin, and when a bubble occurs, a value of the wash bubble flag is set as 1, and when a bubble does not occur, a value of the wash bubble flag is set as 0. A wash low voltage flag is set when an input voltage is a low voltage, and the wash valve modulation flag is a flag representing a valve erroneous connection of cold water and warm water. A heater compulsion termination flag sets whether compulsion termination based on a heating time, and a compulsion termination history is stored for compulsion termination according to time over and compulsion termination according to no temperature change. When a compulsion termination history of at least one time exists, a value 1 representing that a coloring history exists is set.

Diagnosis data of a rinse stroke are a rinse water supply time, a rinse water temperature, a rinse bubble flag, a rinse low voltage flag, and a rinse main valve, and when a rinse stroke performs or at a time point in which a rinse stroke is complete, the data are temporarily stored or updated, and are finally stored.

The rinse water supply time stores a time consumed for supplying water at rinse like wash. In this case, when rinse is repeated several times, a maximum value of measured rinse water supply times is stored. The rinse water temperature is a measured value of each tub temperature before and after supplying water, as in a laundry machine, and a water temperature difference before and after supplying water and a supplied water temperature can be checked using a first rinse water temperature and a second rinse water temperature.

The rinse bubble flag is set or released according to whether a bubble occurs at rinse, the rinse low voltage flag is set when a low voltage occurs at rinse or spin, and the rinse main valve includes information on whether a kind of the main valve is a cold water valve or a warm water valve at final rinse.

Diagnosis data of a spin stroke includes a spin entering couter, a level of wet laundry, an offset value, a target rotation speed, a maximum rotation speed, a spin bubble flag, and a spin low voltage flag, and when a spin stroke is performed or when a spin stroke is complete, the diagnosis data are stored.

The tub may collide with a case of the laundry processing device at spin according to a degree in which the drum or the tub is leaned by the laundry, and in this case, when eccentricity is large, noise increases, spin of a high speed is impossible, and the laundry processing device may be damaged. Accordingly, before performing spin, a degree (eccentricity) of balance or unbalance is measured, and when eccentricity is large, it cannot immediately enter spin, operation of loosing and leveling the laundry is performed. That is, a spin entering counter (UB try Counter) is a spin entering counter when a spin operation cannot be performed because eccentricity is large. This is proportional to a counter of eccentricity measurement and loosing of the laundry.

A wet load level is a quantity of the finally measured laundry before performing spin of a high speed, and a quantity of the laundry when starting wash is a quantity of dry laundry and thus a quantity of wet laundry before spin is recalculated and stored.

A quantity of the laundry may be classified into a plurality of levels like very small quantity, small quantity, an intermediate quantity, a normal quantity, a vast quantity, a very vast quantity, and a single load. An offset value is a value for setting a target rotation speed at spin, and a target rotation speed is a target rotation speed at spin that is reset by eccentricity (unbalance) regardless of initially input operation setting. A maximum rotation speed is a maximum rotation speed measured when a final spin is performed.

A spin bubble flag relates to occurrence of a bubble at spin, and a spin low voltage flag represents whether a low voltage occurs at spin.

Diagnosis data of dry includes a lowest water level, an operation counter of a dry heater, a minimum dry temperature, a motor rotation speed, a lowest voltage, a dry time, a fan motor maximum rotation speed flag, and a dry low voltage flag, and this is stored when a spin stroke is performed or when a spin stroke is complete.

The lowest water level is a value measured at a time point in which an initial drain is complete after entering dry, and a lowest value of values measured until termination is stored. An operation counter of a dry heater is the number of times in which the dry heater is turned on and off, and a lowest dry temperature is a lowest value of measured duct temperature values until immediately before entering cool down.

A fan motor rotation speed (fan motor rpm) is a measured value of a rotation speed of the dry fan in the laundry processing device, and a rotation speed value upon entering cooling down is stored. A dry voltage is a lowest value of voltage values measured from when entering dry at a dry stroke, and a dry time is a time counted from preliminary dry of spin. A fan motor maximum rotation speed flag is set when a rotation speed measured while a fan motor operates exceeds a predetermined reference, and a dry low voltage flag is set when a low voltage is supplied at a dry stroke.

The diagnosis unit diagnoses a failure using data included in product information and derives a solution.

An error occurrence counter in the home appliance, setting data in which the user inputs through the manipulation unit 117 as well as data according to operation of the home appliance as diagnosis data are also included in product information.

An error occurrence counter includes an accumulated error occurrence counter on each error code basis, an operation counter of the home appliance, and a tub wash counter of a laundry processing device of home appliances. Setting data include a value according to a wash course, rinse counts, use language, steam or not, adjustment of a sound level, a spin level, and wash water temperature setting.

The main controller 141 stores each diagnosis data at the memory as product information. When entering a smart diagnosis mode according to an input to the selection unit, the main controller 141 reads stored diagnosis data and forms product information, and the encoding unit 142 generates a predetermined form of control signal by encoding product information. The control signal generated in this way is applied to a modulator, is modulated to a combination of a predetermined frequency signal, and is output as a predetermined sound through the audio output unit 160.

The product information is stored at the home appliance, included in sound to be output in a smart diagnosis mode, is transmitted to the diagnosis server of the service center, and is used for a failure diagnosis of the home appliance.

In order to output a sound including such product information, the home appliance has the following control signal. FIG. 5 is a diagram illustrating encoding of product information of a home appliance and a configuration of a control signal according to the encoding.

As shown in FIG. 5A, the encoding unit 142 forms a packet with a plurality of frames.

The encoding unit 142 adds a product number (product ID) and version information to product information, which is diagnosis data. This is performed in an application hierarchy.

In this case, version information is version information of smart diagnosis algorithm or an entire smart diagnosis system as a version of a smart diagnosis, and version information of a smart diagnosis is protocol name information corresponding thereto.

For example, as shown in FIG. 5B, as a version is represented with 0x01, a protocol name indicates 'smart diagnosis for washing machine v1.0'. Product number is an identifier for identifying a product, and diagnosis data are product information for a failure diagnosis of the home appliance.

A version and product number (product 1D) are directly input to the controller 140, and corresponding information is included and transmitted in a protocol when entering a smart diagnosis mode. In this case, as described above, version information, a main program version, an IDS file version, product kind information, and a model number of a smart diagnosis system are included in a protocol and are transmitted.

However, diagnosis data, i.e., product information is stored at the memory 145 or the storage unit 146. Therefore, when smart diagnosis is performed, the controller 140 loads data stored at the memory 145 and temporary data stored at the storage unit 146 as product information, i.e., diagnosis data.

Figure 6:
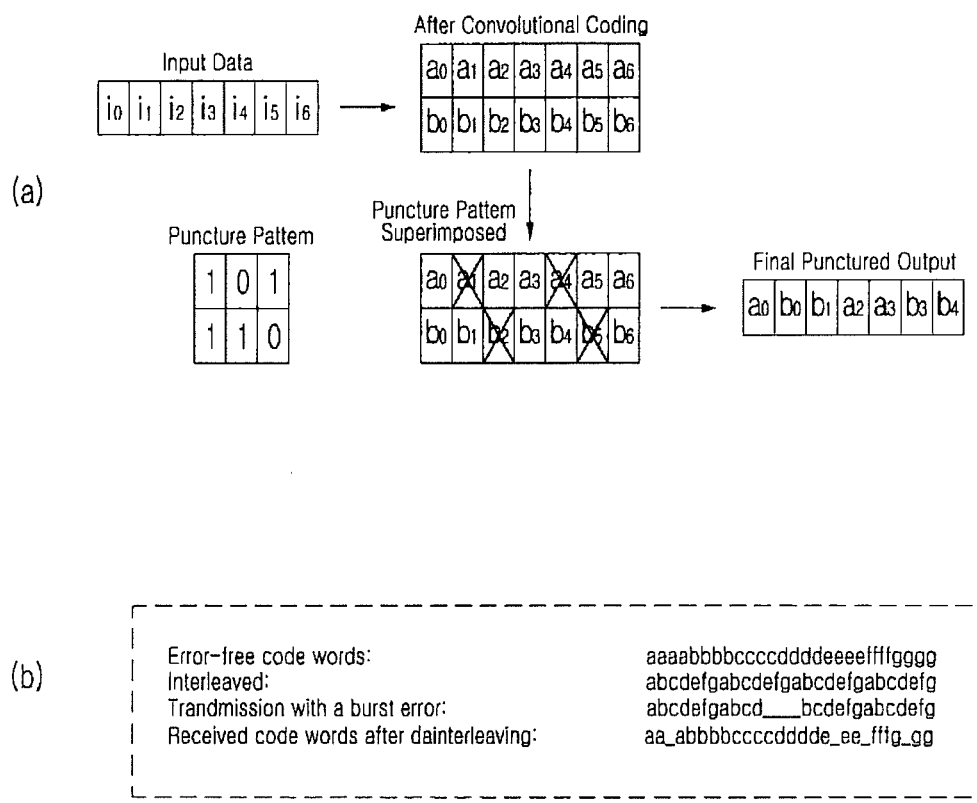
FIG. 6 is a diagram illustrating encoding of product information of a home appliance.

FIG. 6 is a diagram illustrating encoding of product information of a home appliance.

When entering a smart diagnosis mode, the controller 140 calls and encodes previously stored product information and generates a control signal of a predetermined specification.

In order to cope with a data damage problem that may occur in a process in which product information is output as a sound and transmitted through a communication network, the encoding unit 142 encodes product information by applying an error coding method for restoring a bit error. The encoding unit uses, for example, a forward error correction (FEC) encoding method.

In this case, the encoding unit 142 encodes product information using a convolution code. Here, the diagnosis server of the service center decodes using Viterbi decoding algorithm to correspond to such an encoding method.

The encoding unit 142 performs encoding using a logic circuit formed with a shift register and XOR and performs encoding based on ½ code rate in which 2 bits are output to correspond to an input of 1 bit. Because ½ code rate requires many additional redundant bits, the number of redundant bits is reduced using puncturing algorithm.

Puncturing algorithm is a method of removing a bit to a specific pattern among output values encoded to ½ code rate, and a removal pattern is represented as a puncturing matrix. 1 of the puncturing matrix indicates one that does not remove and 0 indicates one that removes. When using such puncturing algorithm, an amount of transmission data reduces and thus a requested data rate can be satisfied. It is preferable to change and use a puncturing matrix in consideration of a transmission speed.

For example, as shown in FIG. 6A, at ½ code rate-based convolution coding, when data of i0, i2, i3, i4, i5, and i6 are input, a0 to a6 and b0 to b6 are output. When a puncturing matrix (puncturing pattern) is applied to a coding value, '0'?portion is deleted and only '1'?portion is remained according to a pattern of a puncturing matrix and thus a0, b0, b1, a2, a3, b3, b4, and a5 are finally output.

FIG. 6A illustrates a coding method, and a coding method of the present invention is not limited thereto. The encoding unit 142 encodes product information with the method of FIG. 6A.

Further, the encoding unit 142 performs bit interleaving to correspond to a bust error that may occur while transmitting data. The encoding unit 142 performs bit interleaving by cutting entire data in a reference bit unit and performs bit interleaving in a 32 bit unit. That is, bit interleaving is a method of mixing an order according to a predetermined rule in a 4 byte unit when data of 60 bytes exist.

For example, as shown in FIG. 6B, when data of aaaabbbbccccddddeeeeffffgggg perform bit interleaving in order of 0, 4, 8, 12, 16, and 20th data and 1, 5, 9, 13, 17, 21st data, order of data is changed to abcdefgabcdefgabcdefgab-cdefg. In a process in which interleaved data are transmitted, even if some bits have lost, when interleaving is adversely performed, the order of data is aa_abbbcccddde_eef_ffg_gg and thus data may be restored using peripheral bits.

Figure 7:
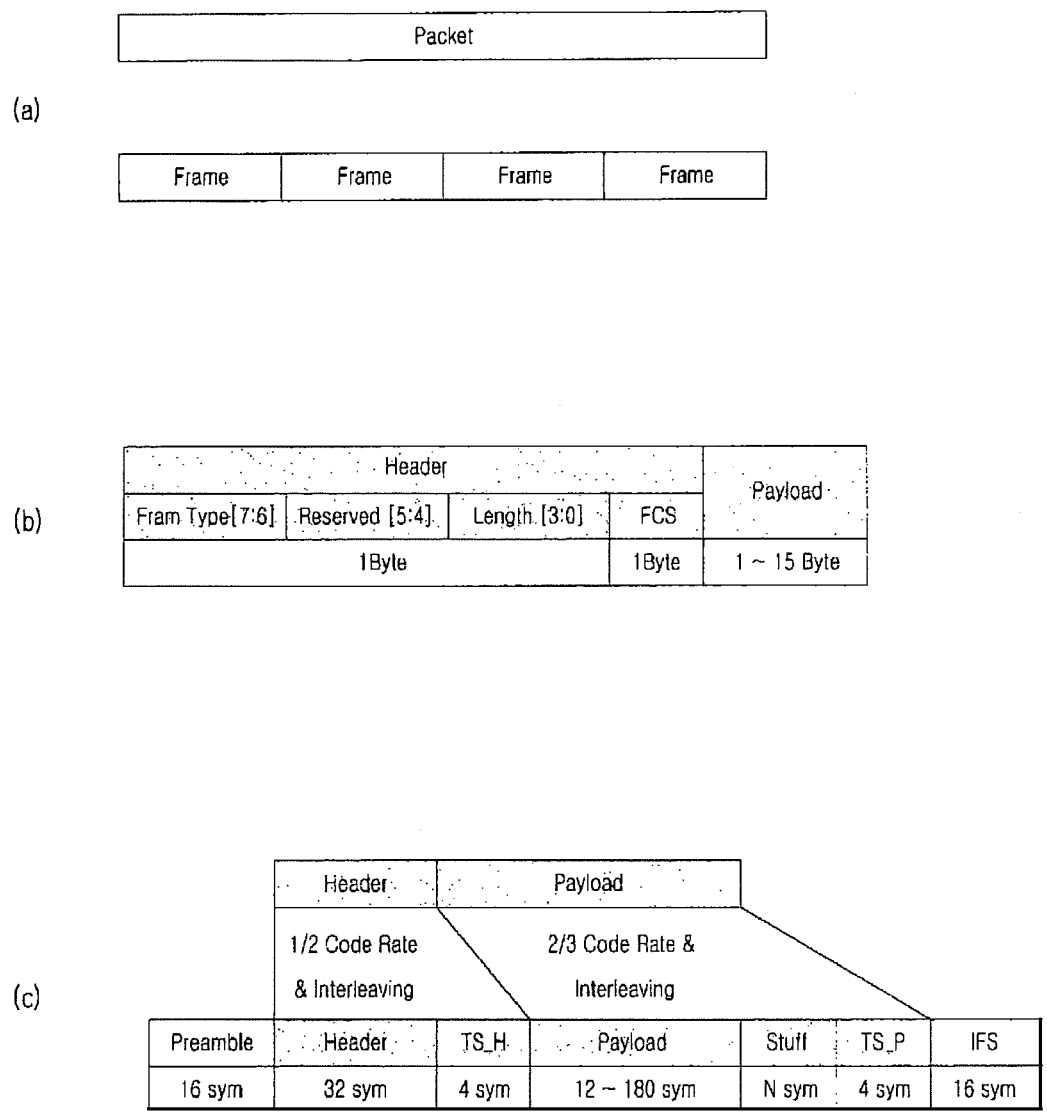
FIG. 7 is a diagram illustrating a configuration and encoding of a control signal.

FIG. 7 is a diagram illustrating a configuration and encoding of a control signal.

As shown in FIG. 7A, in order to form data in which a product number and version information are added to product information in a frame, the encoding unit 142 divides the data in a predetermined unit. The encoding unit 142 uses a frame check sequence (FCS) in order to determine an error in a frame unit.

For example, when data of 60 bytes are divided in a size of 15 bytes, data of 15 bytes are included in one frame and a packet is formed with 4 frames. In this case, the number of frames may be varied according to a divided unit, and the number of frames constituting a packet is also varied. A size of each frame is varied according to IFS, product information, and a symbol type to be described later.

In the encoding unit 142, a frame is formed with a header and a payload, as shown in FIG. 7B.

The header of the frame is formed with a frame type, reserve, a length, and FCS representing a format of the frame. The payload is a field in which data in which a product number and version information are added to product information are divided and included.

A size of a frame type, reserve, and a length is 1 byte, 1 byte is allocated to FCS and thus total 2 bytes are allocated to the header, and 1 to 15 bytes are allocated to the payload. In this case, the frame type, reserved, and a length are formed to have a size of 2 bits, 2 bits, and 4 bits, respectively.

The frame type represents a form and an order of a frame, and information thereof is included in sixth and seventh bits of a header portion, except for FCS. For example, when a frame type is 00, the frame indicates a start portion of a packet. Further, when the frame type is 01, the frame indicates an intermediate portion of the packet, and when the frame type is 11, the frame indicates a final portion of the packet.

Therefore, by classifying the frame type, when the service center 200 collects a plurality of frames, the service center 200 can determine the order of the frames using a frame type.

A length represents a length of a payload included in the frame in a byte unit. The payload has a length of the minimum 1 byte to the maximum 15 bytes, and thus a length field is expressed with 3 bits, and information thereof is included in 0, 1, and 2nd bit of a header portion, except for FCS.

For example, when a value of a length is 001, a payload has a size of 1 byte. When a value of a length is 101, the payload is 5 bytes.

Further, FCS is used for detecting whether an error occurs in the frame. FCS may use a CRC-8 method as a method of detecting whether an error exists in the frame.

Reserved may insert necessary contents upon designing. Reserved is expressed with 4th and 5th bits in a header portion, except for FCS.

Payload is a division of diagnosis data shown in FIG. 5A, and when dividing a packet of 60 bytes into 4 frames by 15 bytes, a payload of 15 bytes per each frame is included. As a frame header is added to such a payload, one frame is formed.

The encoding unit 142 performs FEC encoding for restoring a bit error for a frame, as shown in FIG. 6, follows convolution coding and puncturing method, and performs interleaving.

This is to change to an FEC code by encoding a frame with the above method in order to correspond to damage because a sound output through the audio output unit 160 is damaged by background noise or interference in a process of being transmitted through a communication network.

The encoding unit 142 encodes a header and a payload with each different code rate, as shown in FIG. 7C. The encoding unit 142 codes a header of 2 bytes with ½ code rate based-coding and performs interleaving, and codes a payload of 1 to 15 bytes with ⅔ code rate based-coding and performs interleaving.

That is, as the header encodes, a symbol of 2 bits is output for an input of 1 bit, and in a payload, a symbol of 3 bits is output for an input of 2 bits. In this case, an extended length is reduced through puncturing using the above-described puncturing matrix. In this case, the encoding unit 142 codes to correspond to a bust error while transmitting and then performs bit interleaving in a 32 bit unit.

In this case, upon performing FEC encoding, an additional tail symbol occurs, and because a header and a payload are each encoded, an additional tail symbol of 2 times occurs. The tail symbol may be removed while performing puncturing or interleaving, but a stuff is added to adjust to the predetermined bit number.

Further, the encoding unit 142 adds a preamble to the encoded header and payload. Inter frame space (IFS) is added between a frame and a frame.

The preamble represents the start of one frame and may be formed in various patterns. For example, a pattern of a preamble may be formed in a pattern of 0x0FF0.

IFS is a segment in which a signal is not output between a frame and a frame.

Accordingly, the encoding unit 1420 encodes product information, divides the product information into a frame, and generates a control signal formed with a plurality of frames. In this case, the control signal are formed with a plurality of symbols.

In this case, in one frame, a header, a payload, a preamble, and IFS are formed with a plurality of symbols, and the one frame has a predetermined size. In the frame, the preamble has 16 symbols, the header has 32 symbols, the tail symbol of the header has 4 symbols, the payload has 12 to 180 symbols, the tail symbol of the payload has 4 symbols, and IFS has 16 symbols. The stuff is varied to align in a predetermined size by aligning of the bit number or a modulation result according to an encoding result. That is, when 32-bits are aligned, if a result thereof is 31 bits, a stuff of only 1 bit is added.

That is, one packet is divided into a plurality of frames, the frame includes a preamble, a header, and a payload, and IFS is included between a frame and a frame. Accordingly, one frame is formed with symbols of 84 to 252 from a preamble to IFS, and a stuff symbol may be further included.

The symbol is a data unit constituting a control signal, and when one frequency signal is output to correspond to one symbol, a sound output through the audio output unit 160 may be used as a basic unit representing one information. That is, one symbol may correspond to one frequency signal from an output sound. However, the number of symbols corresponding to a frequency signal may be changed according to the number of frequencies used in the modulator 150.

A frequency signal output to correspond to a symbol is formed with a plurality of pulses, and each pulse has a cycle determined according to a frequency used in the modulator 150.

In this case, a sound output from the home appliance is transmitted to the diagnosis server of the service center through the terminal, and the terminal 80 recognizes a changing signal of signals of an audible frequency band as data, and recognizes a signal having a predetermined pattern even in a time change as noise. In this case, the terminal 80 reduces and transmits a gain of a signal recognized as noise.

The terminal 80 recognizes a sound output from the home appliance 101 according to such a characteristic as noise and attenuates a signal and thus a sound of the home appliance 101 may be not transferred to the service center 200 or may be transmitted in a distorted or damaged state.

Accordingly, when a control signal is generated, the encoding unit 142 of the home appliance 101 divides a packet into a plurality of frames, sets IFS between a frame and a frame, and thus enables a sound not to be recognized as noise in the terminal 80. Inter Frame Space (IFS) is a segment in which a signal is not output between a frame and a frame. Because the terminal 80 recognizes a sound of the home appliance like a common sound signal due to an intermittent sound of IFS before being recognized as noise, the sound can be provided without signal attenuation to the service center 200.

In consideration of a time in which the terminal 80 consumes to recognize noise, before the terminal 80 recognizes a sound output from the home appliance 101 as noise, it is preferable to set an intermittent sound by IFS to occur. When a signal of a predetermined frequency is continued for 2.5 to 6 seconds, the common terminal 80 determines the signal as noise, and a sound signal of the same frequency is determined as noise for the maximum 10 seconds.

Accordingly, it is preferable that the encoding unit 142 enables an output time per one frame to be 2.5 to 3 seconds or less and sets a symbol time and a size of the frame not to exceed the maximum 10 seconds. Here, a time period that takes for one frame to output as sound may be varied according to a symbol time, the number of used frequencies, and a size of a frame.

In this case, even if a mute segment occurs for a predetermined time period, the terminal 80 regards this as a temporal phenomenon, and IFS can be recognized as a state in which a signal is continuously input, and thus it is preferable to set IFS so that the terminal 80 can be recognized as mute.

Further, as a size of an IFS segment decreases, an amount of a signal that can transmit per unit time (e.g., 1 second) increases, but the terminal 80 may determine a sound signal as noise, and as a size of an IFS segment increases, the mobile terminal may not recognize a sound signal as noise, and an amount of a signal that can transmit per unit time (e.g., 1 second) decreases. Accordingly, it is preferable that an IFS segment is set to have a value of 0.1 to 1 second.

For example, as described above, when IFS is set as about 16 symbols, if a symbol time of 1 symbol is 12 ms, IFS is 192 ms.

As described above, the encoding unit 142 encodes and forms product information in a frame, adds a preamble and IFS, and thus generates a control signal for outputting for a sound. The modulator 150 modulates a control signal formed with a plurality of symbols by encoding, as described above in a frame unit. The modulator 150 receives an encoded control signal and modulates the control signal to a frequency signal, applies the frequency signal to the audio output unit 160, whereby a sound including product information is output.

Figure 8:
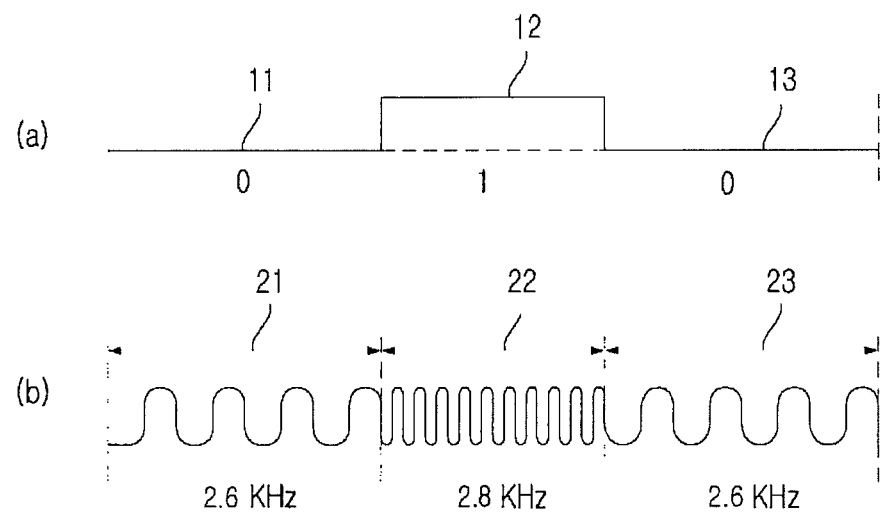
FIG. 8 is a diagram illustrating a frequency modulation performed in a modulator of a home appliance.

FIG. 8 is a diagram illustrating frequency modulation performed in a modulator of a home appliance.

As described above, a frequency of a control signal encoded according to a predetermined method by the encoding unit 142 is modulated by the modulator 150 and is output as a sound through the audio output unit 160.

The modulator 150 uses a frequency deviation method and uses, for example, two frequencies of 2.6 khz to 2.8 khz. The modulator 150 enables to output a frequency of 2.6 khz to correspond to a logical value 0 and to output a frequency of 2.8 khz to correspond to a logical value 1.

When a control signal is 010, a value of a first bit 11 is 0, and thus the modulator 150 modulates the control signal to a signal 21 of a frequency of 2.6 KHz, and because a value in a second bit 12 is 1, the control signal is modulated to a signal 22 having a frequency of 2.8 KHz. Because a value of the third bit 13 is 0, the control signal is modulated to a frequency signal 23 of 2.6 KHz.

In this case, each bit of a control signal is one symbol, and a length of a symbol is a symbol time, and when one frequency signal is output to correspond to one symbol, a length of a basic unit of a frequency signal constituting an output sound may be a symbol time.

Figure 9:
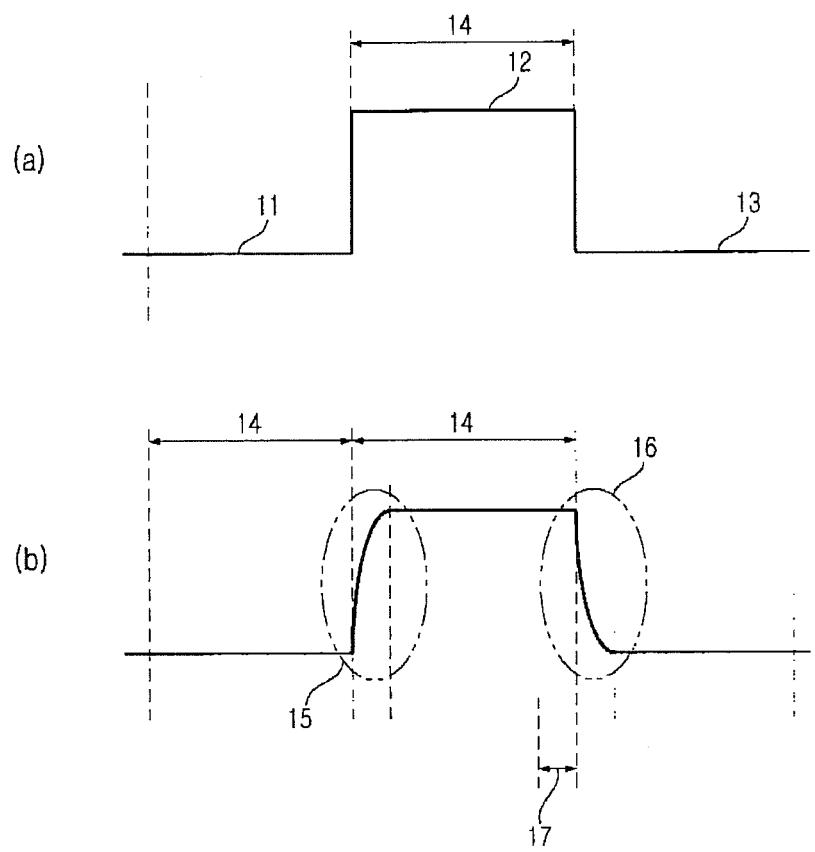
FIG. 9 is a diagram illustrating a dead time.

FIG. 9 is a diagram illustrating a dead time. Referring to FIG. 9, in a process of encoding product information, the encoding unit 142 sets a dead time, and when modulating a signal, at a segment in which a dead time is set, the modulator 150 turns off a resonant frequency for modulating a frequency, thereby stopping signal modulation.

This is to remove a reverberation effect that influences on next signal modulation due to a charge and discharge principle of a capacitor, and two frequencies may appear at a segment in which a value is changed due to a reverberation effect and a signal unnecessary for a sound signal can be added or in a process in which a value of data changes, an influence when one frequency signal changes to another frequency signal remains and may be continued even after a designated time.

Here, IFS is set between frames, and a dead time is set in a symbol unit of a control signal and is different.

As shown FIG. 9A, when a signal is modulated, at a segment in which a value of a control signal is changed from 0 to 1 or from 1 to 0, a value thereof is not immediately changed and is slowly changed, as shown FIG. 9B.

Particularly, when a value of a control signal is changed from 0 to 1 (12, 13), a value of a front signal have an influence on a next signal 13 and thus a dead time is set based on a symbol. For example, a dead time per symbol is set to correspond to a control signal 1 bit, i.e., 1 symbol. However, when a value is not changed and is sustained, a dead time is not set, and only when the value is changed, a dead time may be set.

Because a value of a signal is slowly changed, a dead time 17 is set within a symbol time. In this case, when a dead time is too long, a symbol recognition rate is lowered, and when a dead time is too short, a front signal has an influence on a next signal and thus a dead time should be set to correspond to a symbol size, i.e., a symbol time. Therefore, it is preferable that a dead time is set not to exceed 20% of a symbol time.

When a dead time is set to a control signal, for a segment in which a dead time is set, the modulator 150 stops signal modulation. In this case, when the modulator 150 modulates a signal using a pulse width modulation (PWM) method, at a segment in which a dead time is set, by turning off an oscillation frequency for modulation, frequency signal modulation for a dead time is paused. Accordingly, a sound output through the audio output unit 160 is output in a state in which a reverberation effect between a symbol and a symbol is removed.

When a control signal is modulated at the modulator 150, if a control signal is modulated to a predetermined frequency signal without a dead time, a frequency by PWM is each generated together with a synchronization signal for adjusting synchronization when modulating a signal. In this case, a frequency is generated from a frequency oscillation unit by the number of frequencies used for frequency modulation, and output signals on a frequency basis are coupled and are output as one sound through the audio output unit 160. That is, as described above, when a control signal is modulated to a sound signal without a dead time, a signal at a corresponding segment is longer than a symbol time and thus an error that has an influence on a next symbol time occurs.

This can be applied even when a service center modulates a signal as well as when a sound is output from the home appliance 101 and a next symbol is influenced due to reverberation of a segment in which a data bit is changed.

When modulating a signal using a synchronization signal and a resonant frequency, the modulator 150 stops a resonant frequency by PWM at a segment in which a dead time is set to correspond to a control signal of the controller 140.

Figure 10:
FIG. 10 is a diagram illustrating a waveform in which a diagnosis server receives and restores a sound output from an audio output unit of a home appliance.
Figure 10:

FIG. 10 is a diagram illustrating a waveform in which a diagnosis server receives and restores a sound output from an audio output unit of a home appliance.

As described above, by constituting product information, a control signal is encoded, and by modulating the control signal, the control signal is output as a predetermined sound through the audio output unit. When the output sound is received in the diagnosis server of the service center 200 through a communication network, the diagnosis server receives the sound and performs a failure diagnosis through inverse modulation.

The sound is output from the home appliance, and when the sound is normally transmitted through the communication network and is restored in the diagnosis server, the sound has a waveform of FIG. 10A.

In this way, in order to be restored to a common signal, as described above, in consideration of a characteristic of a communication network and a characteristic of a terminal in the home appliance, product information is formed, and by encoding the product information, the product information can be transmitted. The diagnosis server should also restore product information based on information about a smart diagnosis mode of the home appliance.

When a problem exists in an output of a sound in the home appliance, or when a sound is distorted by the communication network or the terminal and when an error exists in data in a smart diagnosis mode of the home appliance in the diagnosis server, if a signal is cut or distortion occurs in a signal, a failure diagnosis of the home appliance cannot be performed, as shown in FIG. 10B.

FIGS. 11 to 15 are diagrams illustrating an example of a screen in which a method of operating a home appliance is displayed in a display unit of the home appliance according to an exemplary embodiment of the present invention. Hereinafter, an exemplary embodiment displaying information according to a smart diagnosis mode is displayed.

As shown in FIGS. 11A and 11B, when entering a smart diagnosis mode through the selection unit 130, a predetermined image is displayed through the display unit.

In this case, even if the manipulation unit 117 is manipulated, the main controller 141 ignores a signal of the manipulation unit or controls the manipulation unit not to operate, and controls the home appliance to stop a series of operations, except for operation for smart diagnosis.

When such an image is displayed, the user can recognize that the home appliance enters a smart diagnosis mode. Until product information is output as a sound, the main controller 141 controls an image to be displayed.

Figure 12:
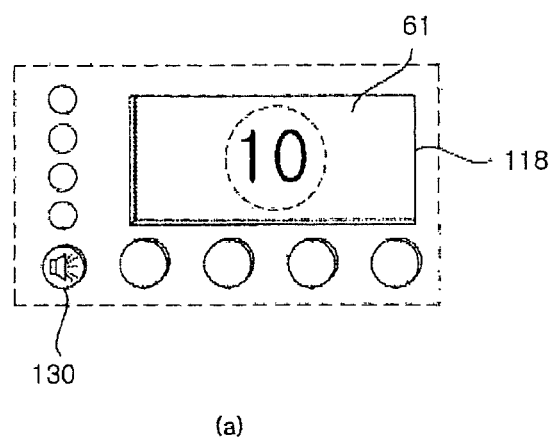
Figure 12:
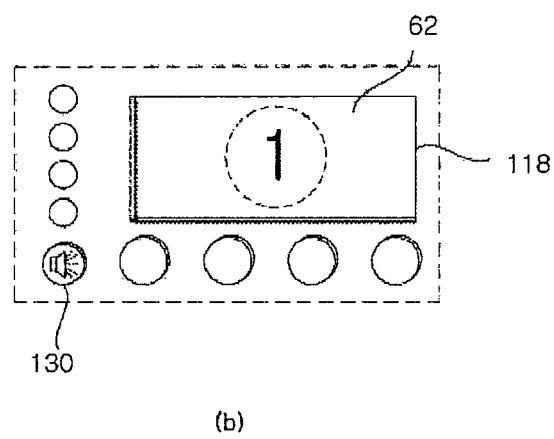
Figure 13:
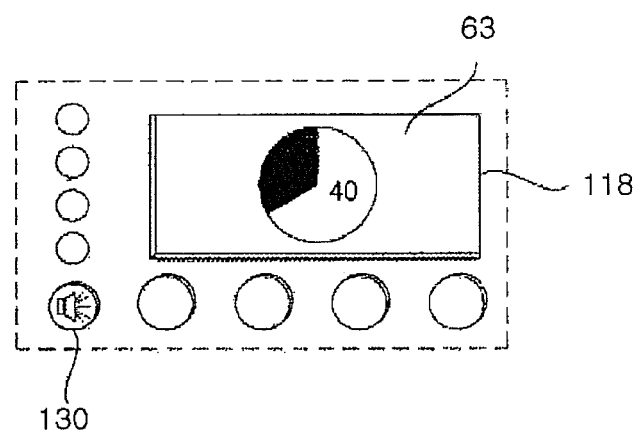
Figure 13:
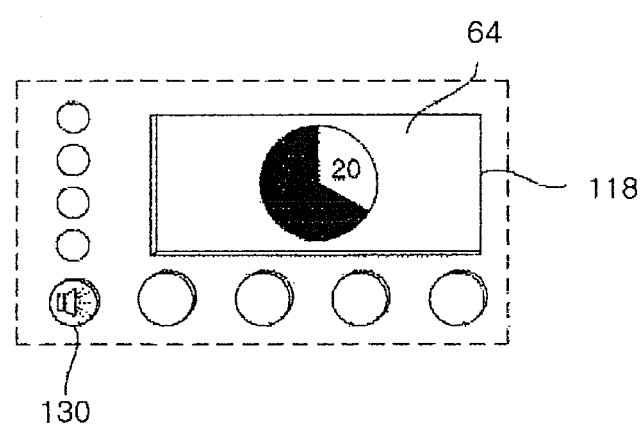
Figure 14:
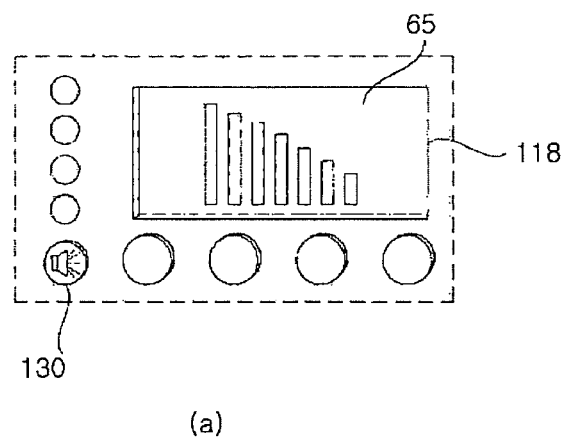
Figure 14:
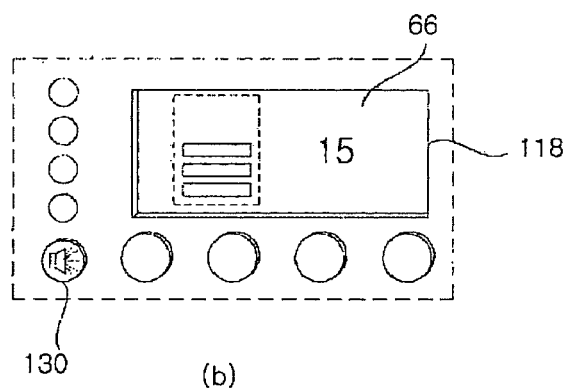

Referring to FIG. 12, before an output of a sound is started and when an output of a sound is terminated, the main controller controls to output product information as a notification sound notifying an output start and termination of sound. Further, a guide message or an image including a text or a numeral may be displayed in the display unit 118.

When an output of a sound is started, an image representing the remaining time until a time point in which an output of a sound is to be terminated may be displayed in the display unit 118.

As shown in FIG. 12A, when the remaining time until a time point in which a sound is to be terminated is 10 seconds, a numeral image 61 representing '10' is displayed in the display unit 118. As a time has elapsed, the displayed numeral reduces, and when 9 seconds have elapsed, a numeral image 62 representing '1' is displayed, as shown in FIG. 12B. That is, an inversely counted image is displayed in the display unit 118.

In this case, such a numeral display may be displayed by LED.

As shown in FIG. 13A, an image 63 in which the remaining time 40 seconds is displayed as a numeral together with a circle graph is displayed in the display unit 118. When a time has elapsed, as shown in FIG. 13B, a circle graph is changed, and an image 64 in which the remaining time 20 seconds together with the circle graph is displayed as a numeral is displayed.

As another exemplary embodiment, as shown in FIG. 14A, an image 65 representing a bar graph of various sizes is displayed in the display unit 118. When a time has elapsed, by first terminating a display of a bar graph having a large size, it is notified that the remaining time is reduced.

As shown in FIG. 14B, an image 66 representing a plurality of bar graphs is displayed in the display unit 118. When a time has elapsed, by decreasing or increasing the number of the displayed bar graph, it is notified that the remaining time is reduced.

Figure 15:
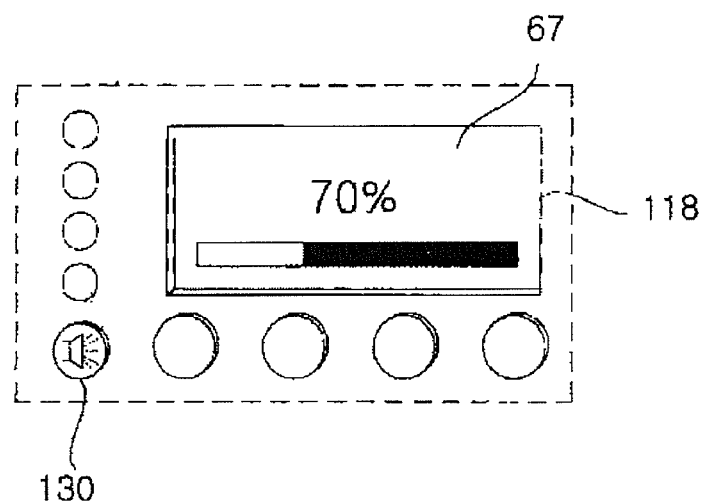

As shown in FIG. 15, in a total time in which a sound is output in the display unit 118, a numeral representing a ratio of the remaining time up to a time point in which a sound is to be terminated may be displayed together with a graph.

Figure 16:
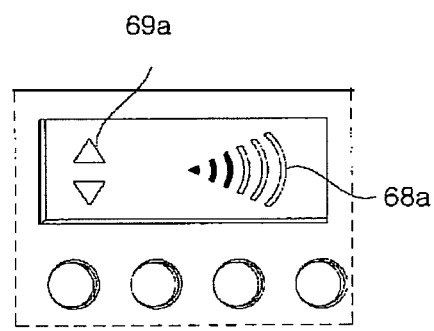
FIG. 16 is a diagram illustrating an example of adjusting a sound volume when a home appliance outputs sound including product information.
Figure 16:
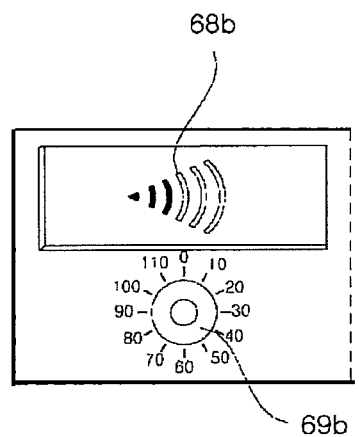

FIG. 16 is a diagram illustrating an example of adjusting a sound volume when a home appliance outputs sound including product information.

As shown in FIG. 16, upon entering a smart diagnosis mode, when the home appliance 101 outputs a sound including product information of the home appliance 101, a sound volume of a sound can be changed (69a, 69b). When a sound volume of the output sound is changed, the sound volume is displayed as a numeral or an image in the display unit 118 to correspond to the change (68a, 68b).

The display unit 118 includes a plurality of LED devices for displaying a magnitude of a sound adjusted by the user. That is, as a magnitude of a sound increases, a plurality of LED devices are sequentially turned on from the lower side to the upper side and thus the user can visually recognize a magnitude of a present sound. Further, when the display unit 118 is embodied as an LCD, a sound volume may be displayed as a numeral or an image in the display unit 118.

The home appliance stores the following product information.

Figure 17:
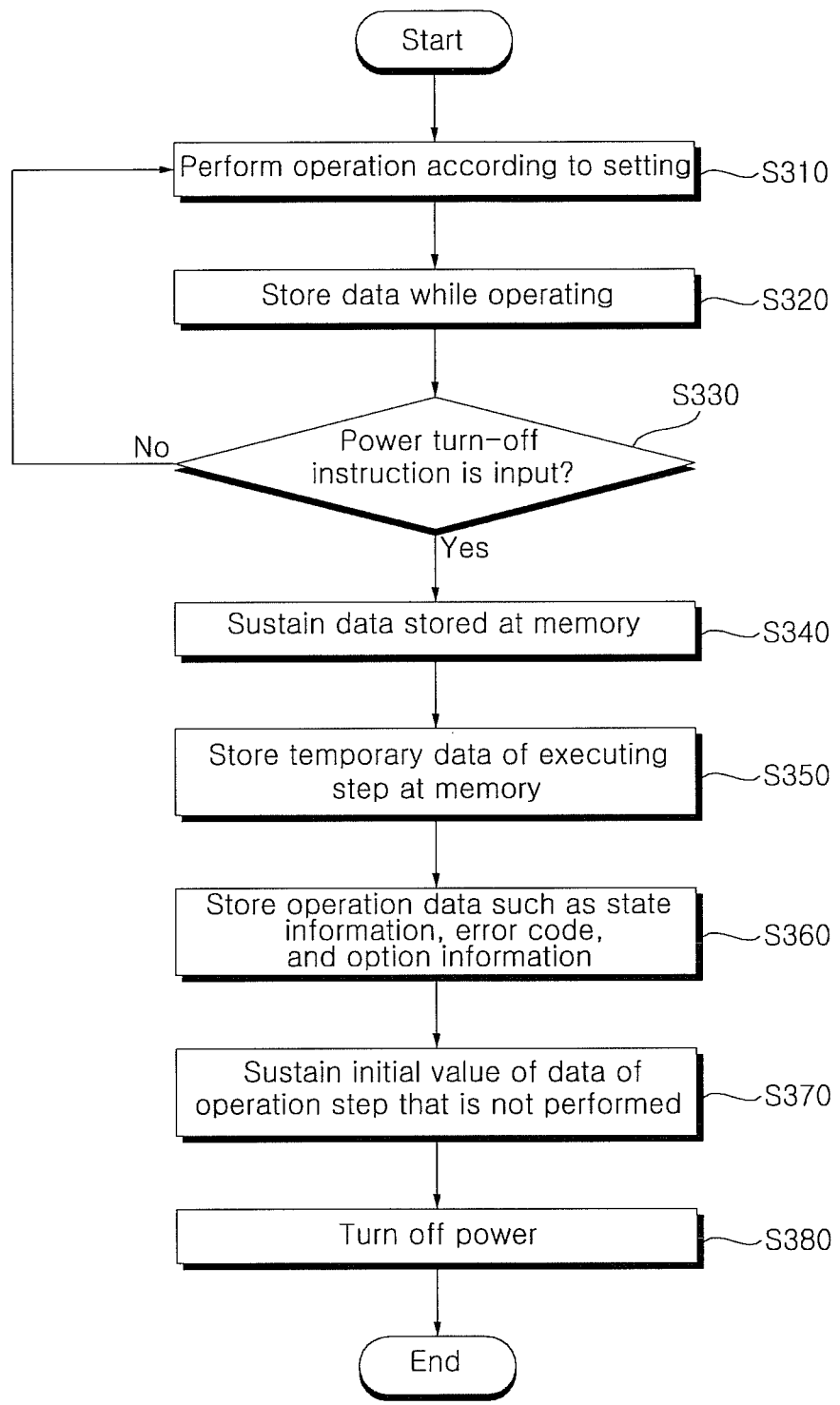
FIG. 17 is a flowchart illustrating a method of storing data according to power termination of a home appliance according to an exemplary embodiment of the present invention.

FIG. 17 is a flowchart illustrating a method of storing data according to power termination of a home appliance according to an exemplary embodiment of the present invention.

Referring to FIG. 17, the home appliance 101 performs operation according to input setting (S310). For example, a laundry processing device sequentially performs a stroke of wash, rinse, and spin to correspond to an input wash course, a water temperature, option setting, a sensed amount of laundry, or eccentricity. In this case, before operation, operation data are initialized, as needed. However, diagnosis data necessary to preserve a history, like data related to an error and data of counts are not initialized, and existing data can be sustained.

Data generated while operating are stored as diagnosis data at the memory 145 or are temporarily stored at the storage unit 146 in at least one time point of a time point before starting operation, a time point at which each stroke is complete, a time point at which all operations are terminated, and a time point at which data are generated according to the kind or an attribute of data (S320). For example, when data are generated, after data are stored at the storage unit 146, which is a temporary storage place, when a wash stroke is complete, data related to a wash stroke may be stored as diagnosis data at the memory 145.

In this case, if a power turn-off instruction is input (S330), the main controller 141 stores and sustains diagnosis data stored at the memory 145 (S340), and stores temporary data of an executing operation stored at the storage unit 146 as diagnosis data at the memory 145 (S350).

For example, while a rinse stroke is performing, if a power termination instruction is input, diagnosis data of the memory 145 are stored and sustained, and temporary data related to a rinse stroke are read at the storage unit 146 and are stored at the memory 145. In this case, the main controller 141 stops a performing operation.

Further, the main controller 141 stores operation data such as state information of a presently performing stroke, a related error code, and option information according to operation as diagnosis data at the memory 145 (S360). When a rinse stroke is performed, information about completion of a wash stroke and information when performing a rinse stroke is stored as state information. In this case, record according to stop of operation and termination of power while operating by a power termination instruction is also included and is stored in operation data.

When an initial operation starts, at operation step in which operation is set and that is not actually performed, an initial data value is sustained (S370).

As described above, when storage of data is complete, the main controller 141 terminates power of the home appliance according to a power termination instruction (S380).

Figure 18:
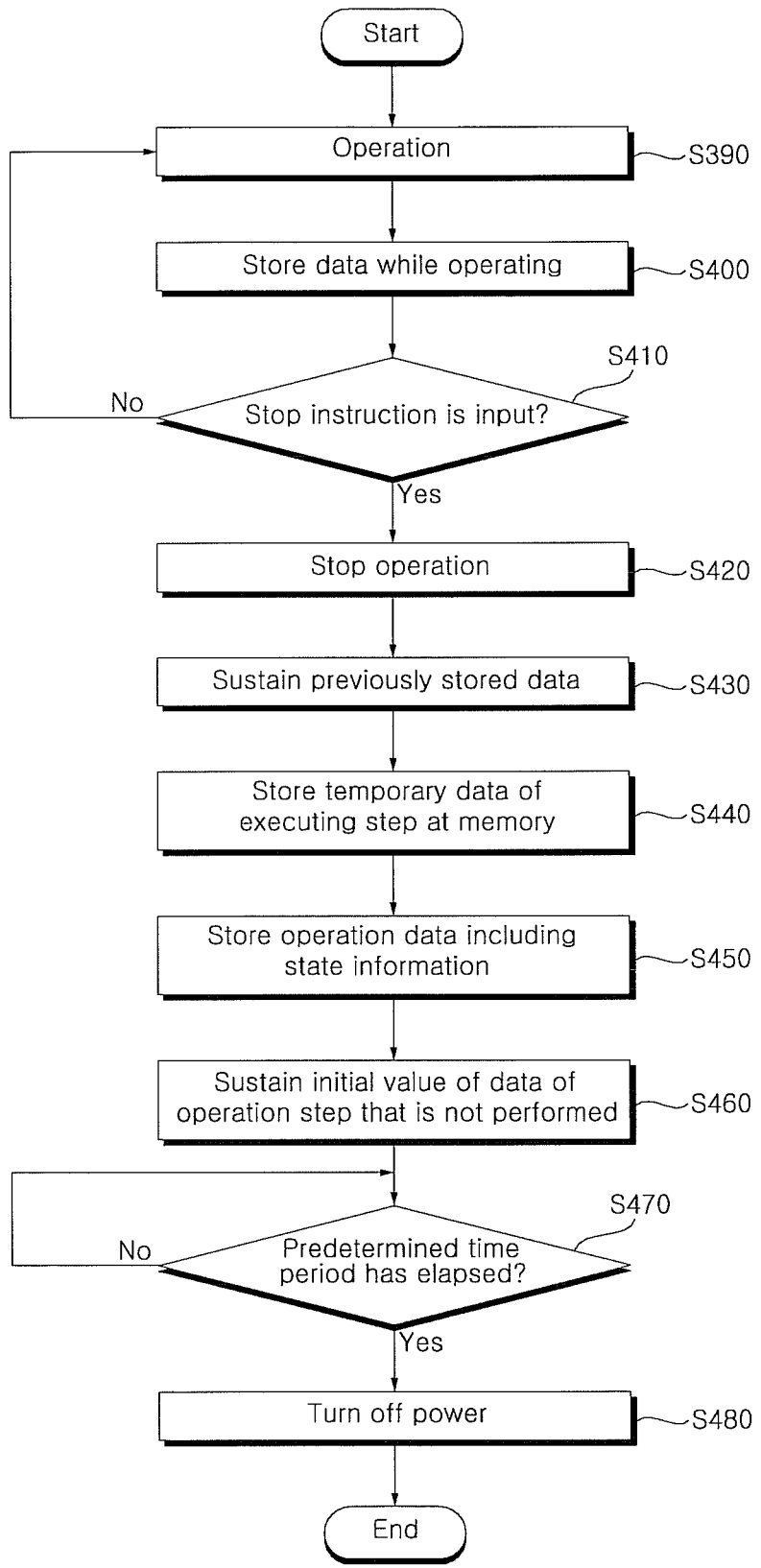
FIG. 18 is a flowchart illustrating a method of storing data according to a stop instruction of a home appliance according to an exemplary embodiment of the present invention.

FIG. 18 is a flowchart illustrating a method of storing data according to a stop instruction of a home appliance according to an exemplary embodiment of the present invention.

Referring to FIG. 18, the home appliance 101 performs operation according to input setting (S390), as described above. As described above, before starting operation, operation data are initialized, and data related to error generation are not initialized and sustained.

Data generated while operating according to setting are stored at the storage unit 146 as temporary data at a designated time point or are stored as diagnosis data at the memory 145 according to the kind of data (S400). In this case, before starting operation, in at least one of a time point at which each stroke is complete, a time point at which all operations are terminated, and a time point at which data are generated, data are stored at the memory 145 or the storage unit 146 according to the kind of data. For example, when data are generated, after data related to a wash stroke are stored at the storage unit 146, which is a temporary storage location, when a wash stroke is complete, temporary data of the storage unit 146 as diagnosis data may be stored at the memory 145.

While operating, when a stop instruction is input (S410), the main controller 141 stops a performing operation (S420) and stores and sustains diagnosis data previously stored at the memory 145 (S430). Further, the main controller 141 stores temporary data stored at the storage unit 146 with related to executing step as diagnosis data at the memory 145 (S440).

Further, the main controller 141 stores operation data including state information according to operation as diagnosis data at the memory 145 (S450). In a rinse stroke, as state information, information of completion of a wash stroke and performing of a rinse stroke is stored.

Data of operation step that is not performed sustains an initial value (S460). In this case, operation setting is sustained to stop operation.

After a stop instruction is input and operation is stopped, when a predetermined time period has elapsed, i.e., after operation is stopped, when a start instruction is not input for a predetermined time period or more (S470), the main controller 141 terminates power (S480).

In this case, after operation is stopped, when a restart instruction is input, the main controller 141 controls to perform operation according to operation setting, but to continue to perform operation step in which operation is stopped, and to sequentially perform next operation according to operation setting.

Figure 19:
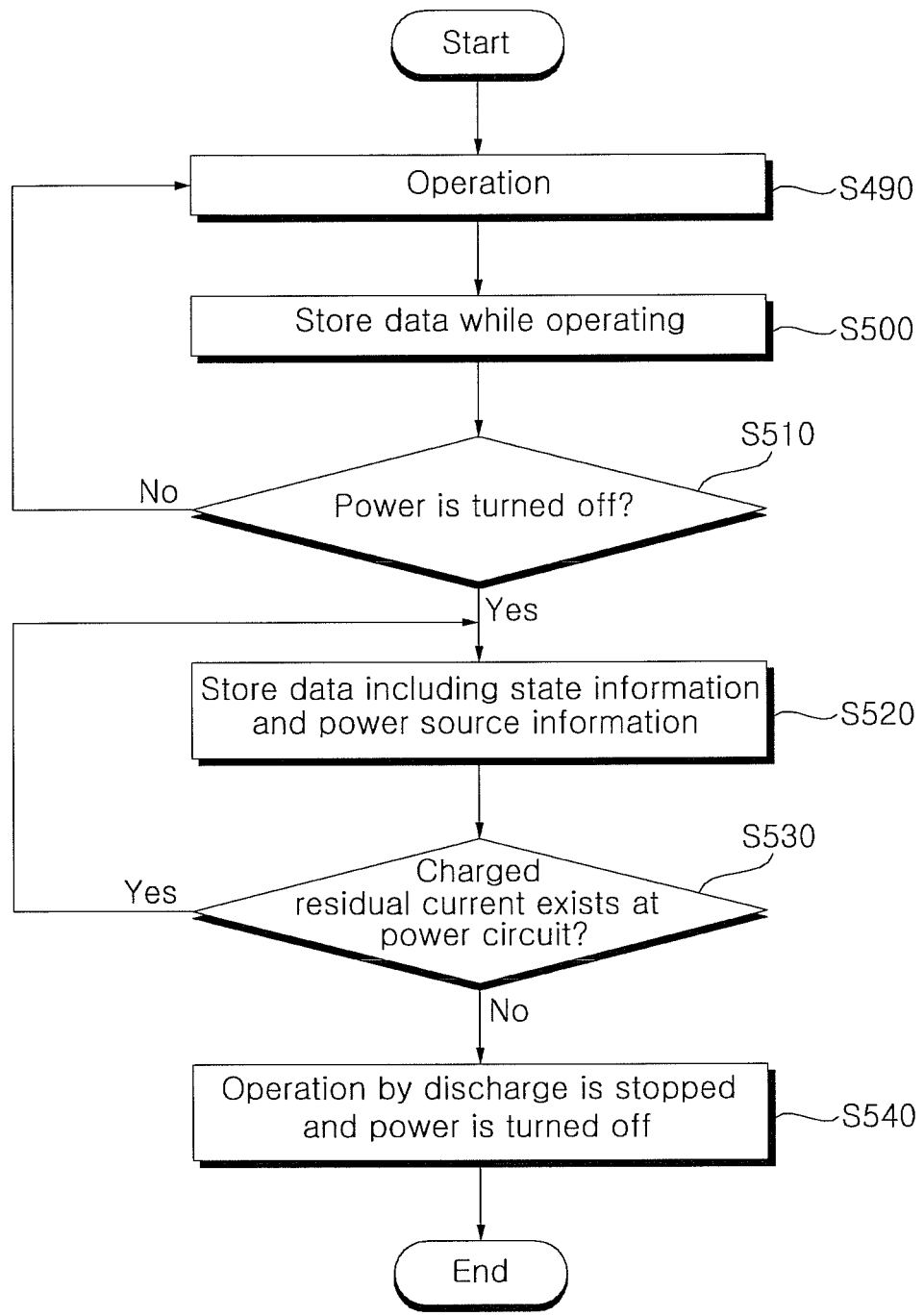
FIG. 19 is a flowchart illustrating a method of storing data according to power interception of a home appliance according to an exemplary embodiment of the present invention.

FIG. 19 is a flowchart illustrating a method of storing data according to power interception of a home appliance according to an exemplary embodiment of the present invention.

Referring to FIG. 19, the home appliance 101 performs a designated operation according to setting, as described above (S490), and the main controller 141 stores data generated while operating at the memory 145 or stores data generated while operating as temporary data in the storage unit 146 (S510).

If power is turned off while operating, for example, if power is not supplied by a power failure, or if power is forcibly turned off for home appliance protection due to an error in a power source, the main controller 141 stores diagnosis data including state information of a presently performing operation and power source information of an error of a power source or a power failure at the memory 145 (S520).

In this case, even after power is turned off, a current charged at a power source circuit of the home appliance is remained and thus the main controller 141 stores diagnosis data using the current, as described above. If a charged residual current exists at the power source circuit (S530), the main controller 141 stores diagnosis data by performing the data storage operation (S520 to S530).

If a charge current does not exist in a power source circuit, all operations of the home appliance are automatically stopped and power is terminated by discharge (S540).

In this case, when power is turned off by the cause, it is preferable that most operation of the home appliance is immediately stopped and a charge current of the power source circuit is used for storing data.

Figure 20:
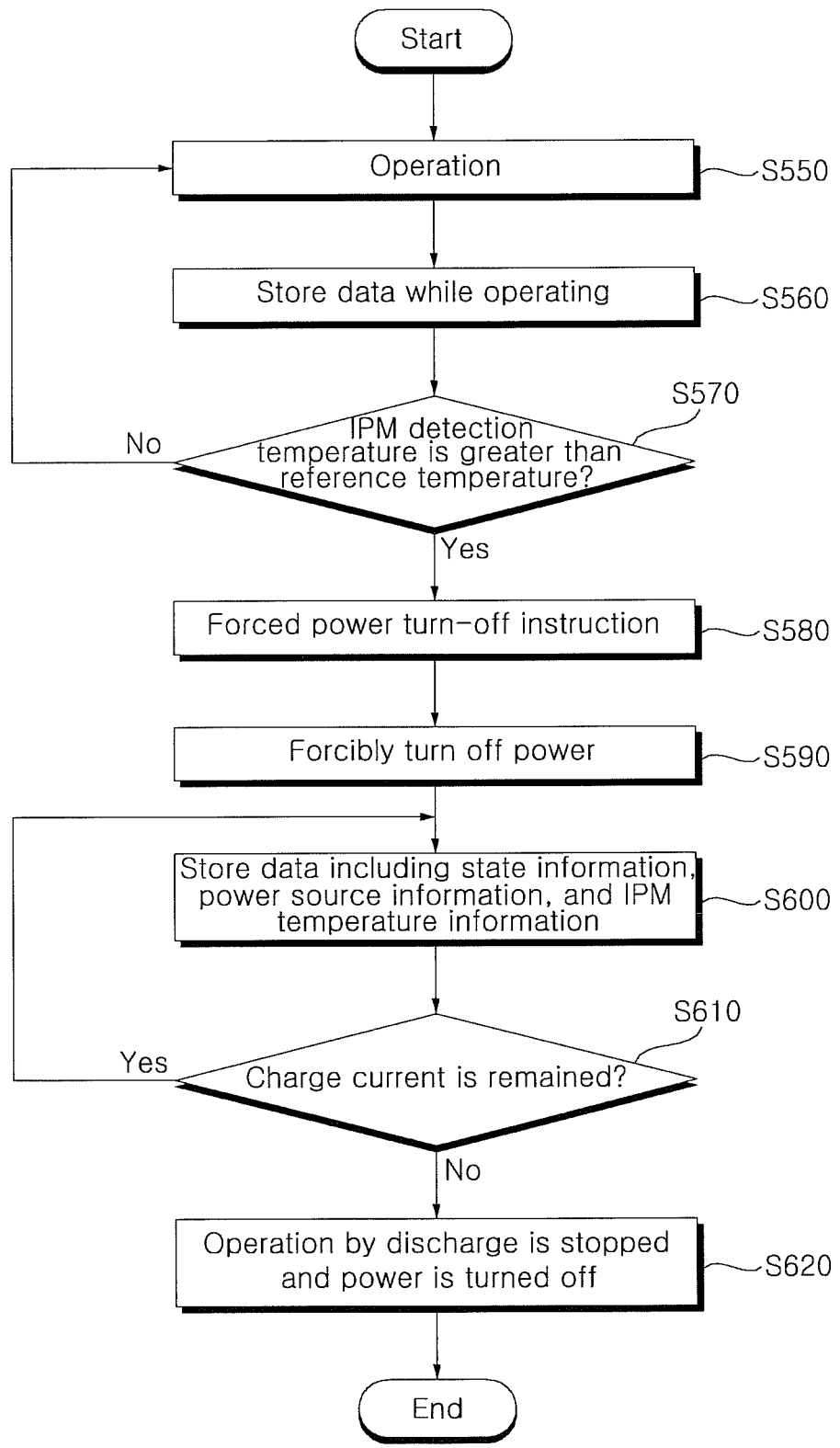
FIG. 20 is a flowchart illustrating a method of storing data according to an operation state of a home appliance according to an exemplary embodiment of the present invention.

FIG. 20 is a flowchart illustrating a method of storing data according to an operation state of a home appliance according to an exemplary embodiment of the present invention.

Referring to FIG. 20, as described above, the home appliance performs a designated operation according to setting (S550), and data generated while operating are temporarily stored at a predetermined time point at the storage unit 146, or are stored at the memory 145 according to the kind of data.

While operating, the main controller 141 receives an input of a pressure and a temperature of each element while operating the home appliance 101 through the detection unit 170. In this case, the main controller 141 determines a state of the home appliance according to a temperature value that is input through the detection unit 170, if an input temperature value is greater than a predetermined reference value (S570), the main controller 141 applies a forced power turn-off instruction to a portion to which power is input (S580).

Accordingly, the input power is forcibly turned off according to a control instruction of the main controller 141 (S590). The home appliance 101 stops operation according to forced power interception.

In this case, the supplied power is turned off, but the main controller 101 stores diagnosis data including state information, power source information, and temperature information at the memory 145 using a charging current remaining in the power source circuit (S600). If a charge current is remained in a power circuit. the main controller 101 continues to perform a data storage operation (S610, S600 to S610).

If a charge current is not remained in a power circuit, all operations are stopped, and power is turned off (S620).

When the stored data enter a smart diagnosis mode through an input of the selection unit 130, the stored data are generated as product information, are encoded as a control signal, are modulated by the modulator 150, and are output as a predetermined sound through the audio output unit 160.

Figure 21:
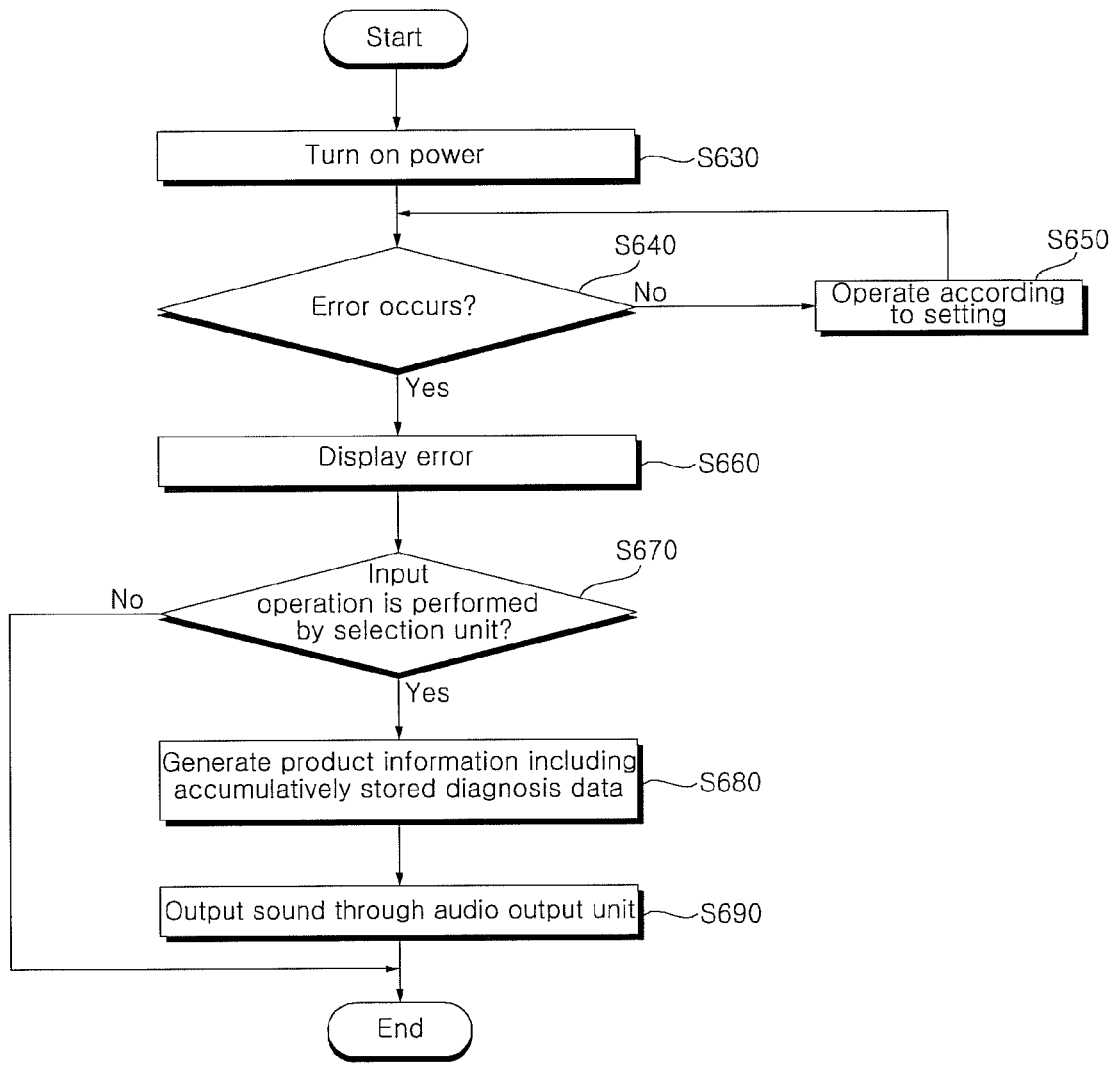
FIG. 21 is a flowchart illustrating a method of storing data according to an error occurrence state while operating a home appliance according to an exemplary embodiment of the present invention.

FIG. 21 is a flowchart illustrating a method of storing data according to an error occurrence state while operating a home appliance according to an exemplary embodiment of the present invention.

Referring to FIG. 21, in one state of a standby state in which power is input to the home appliance 101 and in which an operation instruction is not input, or before operation is set and operation is started, a state in which operation is paused, a state in which operation is stopped, and an operation state (S630), the main controller 141 determines whether an error occurs in the home appliance 101 (S640).

Even if an error occurs while operating, when an error occurs an error occurs in the home appliance as well as when an error occurs while operating, and thus when it is determined that operation cannot be started, the main controller 141 controls the display unit 118 to display an error thereof (S660). In this case, the display unit 118 displays an error code of an occurred error. Further, the home appliance 101 may output a warning sound or warning light in addition to an error display through the display unit.

For example, when an error occurs in input power, when water is not supplied, when a door of a laundry processing device is opened, or when an error is determined by data detected while operation, the main controller 141 controls to display an error related thereto.

Information on occurrence of an error as diagnosis data is stored at the memory 145 by the main controller 141.

As described above, when an error occurs, if an input operation is performed by the selection unit 130, the main controller 141 generates product information including the accumulatively stored diagnosis data (S680). The generated product information is applied to the encoding unit 142, and the encoding unit 142 adds predetermined data to product information or divides product information into a predetermined size and generates a control signal of a predetermined format by encoding according to a designated method. The modulator 150 receives a control signal, modulates to a predetermined frequency signal to correspond to a logical value of a control signal, and applies the predetermined frequency signal to the audio output unit 160.

Figure 22:
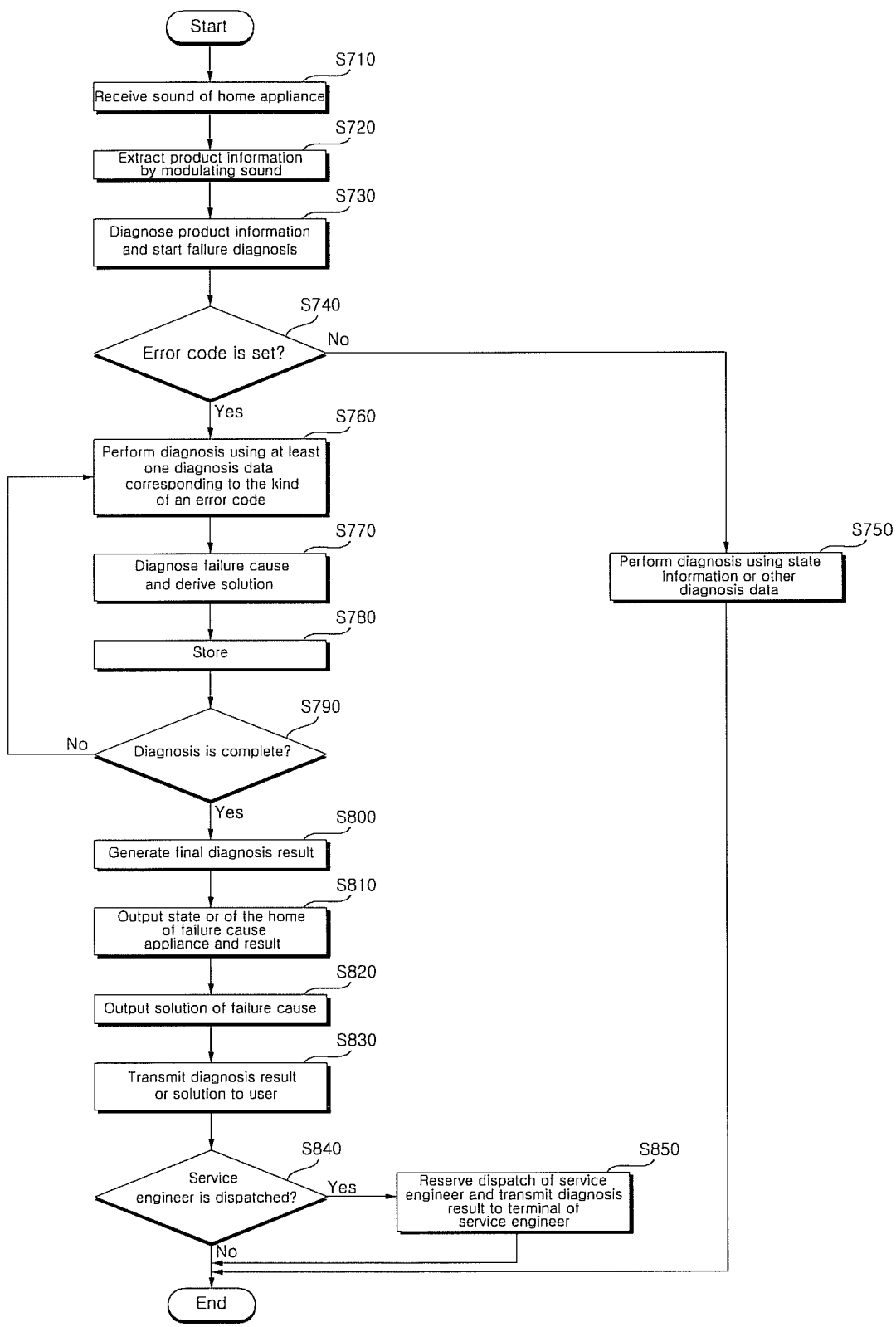
FIG. 22 is a flowchart illustrating a method in which a home appliance diagnosis system diagnoses according to an exemplary embodiment of the present invention.

The diagnosis server of the service center analyzes a received sound and performs diagnosis of a failure. FIG. 22 is a flowchart illustrating a method in which a home appliance diagnosis system diagnoses according to an exemplary embodiment of the present invention.

Referring to FIG. 22, when product information is output as a predetermined sound from the home appliance 101, the product information is transmitted to the service center as a sound signal through a communication network in which communication is connected by the user.

The diagnosis server of the service center 200 receives a sound output from the home appliance 101 (S710), extracts product information by modulating the sound according to a predetermined method (S720), and diagnoses a state, a failure, and a failure cause of the home appliance using a plurality of data included in the product information, and starts a failure diagnosis for deriving a method for coping with the failure (S730).

In this case, the diagnosis unit 260 acquires version information of a home appliance diagnosis system and model information of the home appliance through a plurality of data included in product information, analyzes diagnosis data included in product information, thereby performing a failure diagnosis of the home appliance.

The diagnosis unit 260 analyzes first state information or an error code of diagnosis data included in product information, compares data related thereto with a failure diagnosis data or reference data, thereby performing a failure diagnosis. The diagnosis unit can basically use all diagnosis data included in product information, but analyzes data related thereto using state information or an error code, thereby more quickly determining a state of the home appliance confirm and performing a failure diagnosis thereof. In this case, the diagnosis unit classifies diagnosis data included in product information according to a predetermined reference, i.e., according to state information or error code, thereby searching for the most likely failure for an error of the home appliance and performing a diagnosis thereof.

The diagnosis unit 260 determines whether an error code is set to a plurality of diagnosis data included in product information (S740). If an error code is 0 or an unregistered error code occurs, the diagnosis unit 260 determines that an error code does not occur in the home appliance and performs a failure diagnosis of the home appliance using diagnosis data or state information included in product information other than an error code (S750).

If an error code is set, i.e., if a corresponding error code occurs in the home appliance, the diagnosis unit 260 determines a system in which an error occurs in the home appliance using an error code and performs a failure diagnosis of the home appliance by extracting diagnosis data related thereto (S760).

The diagnosis unit 260 diagnoses a failure cause and derives measures corresponding thereto, i.e., a solution (S770). If a failure cause and a solution are derived through a failure diagnosis, the diagnosis unit 260 stores the failure cause and the solution as a diagnosis result (S780).

In this case, because a plurality of failures may occur in the home appliance, the diagnosis unit 260 performs an additional diagnosis using other diagnosis data corresponding to the kind of an error code (S790, S760 to S780).

If a diagnosis is complete (S790), the diagnosis unit 260 applies a diagnosis result to the server controller 210.

The server controller 210 generates a final diagnosis result through a diagnosis result applied from the diagnosis unit 260 (S800). That is, when a plurality of failures occur, several causes and results thereof may exist and thus the server controller 210 generates a final diagnosis result through at least one diagnosis result applied from the diagnosis unit 260.

The server controller 210 outputs a state or a failure of the home appliance and a result of a failure cause through the server display unit 270 (S810). In this case, when a failure cause is in plural, a result thereof may be displayed in a list. When one item of results of the displayed failure cause is selected and input, the server controller 210 outputs a solution thereof (S820).

Further, the server controller 210 transmits the diagnosis result in a mail or message form using a previously registered user's e-mail or phone number (S830).

In this case, a counselor of the service center 200 determines a result displayed on a screen. Further, when one item is selected and input, a solution thereof is displayed on the screen. The counselor of the service center can guide the displayed cause and solution using a voice to the user to which a phone is connected. Further, the advice or of the service center may perform a reservation that dispatches a service engineer to the user's home according to a cause and a solution.

Further, when dispatch of the service engineer is included in the solution, the server controller 210 may transmit a diagnosis result to a terminal of the service engineer (S840, S850).

A home appliance diagnosis system and a method of operating the same according to the present invention are described with reference to the attached drawings, but are not limited by exemplary embodiments and drawings described in this specification and can be applied within the spirit and scope of the present invention.

The invention claimed is:

1. A home appliance, comprising:
   a selection device that receives input of an instruction to perform a failure diagnosis;
   a memory that stores product information of the home appliance for the failure diagnosis;
   a controller that changes a mode of the home appliance to a smart diagnosis mode, encodes the product information stated in the memory and generates the product information into a control signal formed with a plurality of frames, when a fail diagnosis execution instruction is input by the selection device;
   a modulator that generates a predetermined frequency signal to correspond to the control signal; and
   an audio output driven by the modulator to output a sound to correspond to the frequency signal, wherein the controller comprises:
      a main controller that controls to display a progress state of a smart diagnosis mode through a display, when entered into a smart diagnosis mode by an input to the selection device; and
      an encoder that generates the control signal by encoding the product information to a control signal of a predetermined format, wherein the encoder sets an IFS, which is a segment in which a signal is not output for a predetermined time period, between the plurality of frames.

2. The home appliance of claim 1, wherein the encoder encodes product information by applying an error coding method to restore a bit error in order to cope with a data damage problem that may occur in a process of transmitting the sound output through the audio output through a communication network.

3. The home appliance of claim 2, wherein the encoder encodes the product information using a forward error correction (FEC) encoding method.

4. The home appliance of claim 3, wherein the encoder encodes the product information using a convolution code, uses a puncturing method, and performs interleaving.

5. The home appliance of claim 1, wherein the encoder adds a preamble and an error check bit by encoding in a predetermined format to the product information and generates a control signal so that a plurality of symbols form one frame.

6. The home appliance of claim 1, wherein the encoder sets a dead time to the symbol at a segment in which a data value is changed to remove a reverberation effect that influences on a next signal modulation due to a charge and discharge principle of a capacitor.

7. The home appliance of claim 4, wherein the encoder forms the frame with a header and a payload, and the header of the frame comprises a frame type, reserve, a length, and FCS representing a type of the frame, and diagnosis data in which a product number and version information are added to product information are divided and comprised in the payload.

8. The home appliance of claim 7, wherein the encoder codes the header to 1/2 code rate base and performs interleaving, and codes the payload to 2/3 code rate base and performs interleaving, and encodes the header and the payload to each different code rate.

9. The home appliance of claim 1, wherein the controller stores at least one information of temporary data, state information, an error code, option information, or power source information as diagnosis data upon emergency stop and generates the product information as the diagnosis data.

10. A home appliance diagnosis system, comprising:
    a home appliance that outputs necessary product information with a predetermined sound upon diagnosing a failure;
    a diagnosis serve that analyzes the product information by receiving the sound, diagnoses a state, a failure, and a Mute cause of the home appliance by extracting predetermined data of diagnosis data comprised in the product information, and derives measures of a failure; and
    a terminal that receives the sound output from the home appliance as a sound signal and transmits the sound signal to the diagnosis server through a communication network, wherein the home appliance encodes the product information, generates the product information into a control signal formed with a plurality of frames, and sets an IFS, which is a segment in which a signal is not output for a predetermined time period, between the plurality of frames.

11. The home appliance diagnosis system of claim 10, wherein the diagnosis server comprises a signal processor that receives the sound encoded using a convolution code in the home appliance and decode using Viterbi decoding algorithm.

12. The home appliance diagnosis system of claim 11, wherein the signal processor receives the sound, divides the sound into a plurality of frames, and collects the plurality of frames by dividing an order of a frame using a frame type comprised in each frame.

13. The home appliance diagnosis system of claim 10, wherein the diagnosis server comprises a diagnosis device that analyzes an error code of the diagnosis data and diagnoses the home appliance by extracting at least one data related to the error code.

14. A method of operating a home appliance, the method comprising:
- storing product in anon when an error occurs;
- entering a smart diagnosis mode, when an instruction to perform a failure diagnosis is input;
- dividing the stored product information into a plurality of frames and generating a control signal by encoding in a frame unit; and
- modulating the control signal using a plurality of frequencies and outputting the control signal with a predetermined sound through an audio output, wherein the generating of the control signal comprises encoding the product information to a predetermined format so that a plurality of symbols form one form and setting an IFS to the plurality of frames.

15. The method of claim 14, wherein the storing of product information comprises storing at least one of temporary data, state information, an error code, option information, or power source information as diagnosis data when a stop instruction is input by at least one of stop, power interception, a power failure, or forced termination while operating, by a key manipulation while operating.

16. The method of claim 14, further comprising displaying information about a smart diagnosis mode and a progress state when entering the smart diagnosis mode.

17. The method of claim 14, wherein the generating of the control signal comprises using a convolution code, encoding using a puncturing method, and performing interleaving.

* * * * *